United States Patent [19]
Brown et al.

[11] Patent Number: 6,081,293
[45] Date of Patent: Jun. 27, 2000

[54] LINEAR MOTOR FILM GATE FOR TELECINE

[75] Inventors: Brian K. Brown, Grayson; Larry D. Bisel, Canton; Nathan R. Gleit; Walter K. Chambliss, both of Atlanta, all of Ga.

[73] Assignee: Steadi-Film Corp., Atlanta, Ga.

[21] Appl. No.: 08/827,788

[22] Filed: Apr. 11, 1997

[51] Int. Cl.⁷ ..................................... H04N 3/40
[52] U.S. Cl. .................. 348/97; 348/98; 352/191; 352/221; 386/128
[58] Field of Search ............... 348/97, 98; 386/128; 352/191, 221; H04N 3/40

[56] References Cited

U.S. PATENT DOCUMENTS

| | | |
|---|---|---|
| 2,418,943 | 4/1947 | Jones . |
| 2,425,217 | 8/1947 | Wienke . |
| 2,552,255 | 5/1951 | Capstaff . |
| 3,051,955 | 8/1962 | Pfleger et al. . |
| 3,271,099 | 9/1966 | Debrie . |
| 3,447,866 | 6/1969 | Heisler . |
| 3,720,461 | 3/1973 | Reinsch et al. . |
| 4,054,912 | 10/1977 | Millward et al. . |
| 4,104,680 | 8/1978 | Holland . |
| 4,149,191 | 4/1979 | Longchamp . |
| 4,184,177 | 1/1980 | Millward . |
| 4,205,337 | 5/1980 | Millward . |
| 4,524,392 | 6/1985 | Poetsch . |
| 4,726,674 | 2/1988 | Smith et al. . |
| 4,823,204 | 4/1989 | Holland . |
| 5,266,979 | 11/1993 | Brown et al. . |
| 5,644,356 | 7/1997 | Swinson ................................ 348/96 |

FOREIGN PATENT DOCUMENTS

| | | |
|---|---|---|
| 43 37 156 C1 | 9/1994 | Germany . |
| 4686 | 11/1896 | United Kingdom . |
| 1 519 398 | 7/1978 | United Kingdom . |
| WO 88/01822 | 3/1988 | WIPO . |

*Primary Examiner*—Howard Britton
*Attorney, Agent, or Firm*—Morris, Manning & Martin

[57] ABSTRACT

A linear motor driven film gate for a motion picture telecine and methods for operation. A housing associated with a telecine optical block is operative to support and transport a single film frame in a precisely controlled linear motion past a telecine scanning aperture for scanning. An entry guide sprocket on the telecine receives the film from a feed spool, stabilizes the film, and directs the film across the aperture. A pin assembly carrying precision milled registration pins on a film transport carriage engages with the film sprocket holes in a path perpendicular to the film plane. After the registration pins are engaged with the sprocket perforations, a precision linear motor with integrated optical position encoder pulls a single frame across the scanning aperture. When a single frame has passed by the aperture, the linear motor stops, and the registration pins are removed from engagement with the film. The linear motor then returns to an initial position to engage a subsequent frame of film.

42 Claims, 15 Drawing Sheets

LINEAR MOTOR FILM GATE FOR TELECINE

TECHNICAL FIELD

The present invention relates generally to apparatus for transferring motion picture film to video signals utilizing a telecine, and more particularly relates to a linear motor film gate for transporting a single frame of film past a scanning aperture in a precisely controlled linear motion.

BACKGROUND OF THE INVENTION

A "telecine" is an apparatus utilized to transfer a motion picture film, for example a negative film shot in a motion picture camera, to a video signal format for storage or broadcast. Telecines are employed by motion picture and television production and post-production facilities to create video tapes of movies, commercials, news clips, and the like.

In a typical telecine, a source of light such as a flying spot scanner or a laser beam scans the film, or a light bulb projects the image onto a light detecting array, frame by frame, in a line-by-line or raster scan fashion. The light from the light source is transmitted through the film in a "film gate" on the telecine, and received by a light detector positioned to receive light transmitted through the film. A film gate includes an aperture ("frame aperture") for passing light from the light source to the telecine light detector and supports the film as it is scanned. The transmitted light is then converted into electrical signals, converted into an appropriate video signal format such as NTSC or PAL, and stored on a video tape or other storage device.

A CCD line array telecine is an apparatus in which consecutive frames in a cinema or movie film are optically scanned in a raster fashion by scanning each frame, one line at a time, with an imaging array of charge coupled devices, wherein the picture information is thereby converted by the CCD array into electrical signals. From the electrical signals, a television signal is ultimately derived from scanning respective consecutive film frames.

There are two primary types of film transfer in telecines—(1) intermittent or "start/stop", and (2) real-time or continuous motion. U.S. Pat. No. 5,266,979 to Brown et al. is an example of the latter type of device. In the intermittent or "start/stop" type of film transfer, each frame of the film is located or "registered" at the frame aperture; in some cases, the film is held motionless during the scanning process; in other cases, a frame is pulled past a frame aperture slit that allows light to pass through a "line" in the film onto the CCD imaging array in the telecine. In the real-time or continuous motion telecine, the film is moved continuously with a film drive to move the film through the machine during the scanning process.

Servomotors and related control circuitry are used in the prior art in an effort to move the film at a constant rate relative to the imaging array, but are considered inadequate to provide highly-reliable speed regulation for that purpose. If the speed of the film varies as the frame is moved past the aperture slit, distortions in the scanned image are created.

A particular difficulty encountered in telecine devices is the maintenance of the image on the film in reference to a stable image reference. The problem is particularly pronounced when images from different sources are superimposed, for example, when a computer-generated title or other graphics are superimposed against a scene represented by a motion picture film. If the image on the film is not stable relative to the superimposed graphics such as a title, the title may be seen to weave or jitter in relationship to the background. The jitter or weave problem derives from the fact that the positional reference for the film and for the overlaid graphics are not the same. When a film is originally shot in a camera, the image is mechanically registered on a particular film frame relative to the sprocket holes in the film. The tines of a sprocket in the camera engage the sprocket holes in the film to register the film relative to the camera's optics. Such devices, including cameras, are considered mechanically or machine pin registered.

When a film from a motion picture camera is then to be transferred to video in a telecine, the film may not necessarily be machine pin registered but drawn through the machine by a continuous motion film drive. Typically, a drive capstan pulls the film through the film gate in a continuous motion device. In some continuous motion telecines, the film is edge-guided during the transfer. Film weave or jitter may be introduced as the edge of the film varies relative to the position of the sprocket hole. It is known that film edges tend to vary in distance from the sprocket holes due to manufacturing imperfections and tolerances in the film.

Various approaches have been employed to minimize film weave in film-to-tape transfers. One approach involves use of a single mechanical sprocket drive for moving the film through the telecine. This method introduces small but pronounced speed changes as the sprocket tines enter the sprocket holes, and therefore introduces another source of jitter. Moreover, mechanical sprocket drives are not favored because of the wear and tear on the film.

Other mechanical solutions involve mechanical pin registration with the start/stop devices discussed above. In a conventional start/stop approach, the film sprocket holes are lowered, frame by frame, onto stationary register pins with a stepping motor controlled by an auxiliary computer. The film is held steady by pins during the transfer, and then a gate attachment is released to allow the film to advance.

Such start/stop mechanical pin registration devices are complicated mechanically, limited in speed, and produce significant wear and tear on the film because of repeated acceleration and deceleration of the film. Nonetheless, there are certain desirable applications for the start/stop approach. In particular, if a film frame can be drawn past the scanning aperture in a sufficiently precise motion, distortion in the picture (typically in the vertical dimension, or "line distortion") can be substantially reduced or eliminated.

Prior to the present invention, it has not been possible to transport a single frame in a start/stop motion with extremely precise motion.

One known approach to the problem of film weave and jitter relies upon electronic scanning of the sprocket holes and generation of correction signals used in the raster scanning process. U.S. Pat. Nos. 4,823,204 and 4,104,680 to Holland are directed to electronic methods and apparatus for correction of film weave, by scanning the sprocket hole of the film and generating a correction signal to compensate for the film weave. The film weave correction signal is then used to adjust the position of the scanning beam to compensate for motion of the film as detected by the scanning of the sprocket holes. However, systems that use the sprocket hole scanning approach are electronically complex and expensive.

Electronic methods for film weave correction that involve scanning of the sprocket holes such as shown in U.S. Pat. Nos. 4,823,204 and 4,104,680 typically involve modifying the film gate of a telecine such that the sprocket hole area of the film may be scanned. Thus, a hole or slot must be machined in the film gate to permit the detecting beam to scan the sprocket hole. Additionally, it may be necessary to supply higher powered deflection amplifiers for the rapid deflection of the scanning beam of the light source to the sprocket hole area, or provision of a separate detecting beam, both of which add to the complexity and expense of these electronic methods for film weave correction.

The conventional film gate used in a prior art Rank telecine for 35 mm film includes a single feed sprocket. The teeth on this sprocket are very small relative to the dimensions of the film perforations and consequently does not prevent the weave or jitter of the film. In addition, the Rank mechanism only includes the single sprocket immediately preceding the frame aperture and thence to a roller without any teeth or other guides for imparting stability. There is consequently no control of film movement either going into or leaving the film gate.

Accordingly, there is a need for an improved stop motion film gate that is able to transport a film frame past a scanning aperture in a precisely controlled and constant linear motion, to reduce distortions in the scanned image produced by nonlinearities in the transport motion.

SUMMARY OF THE INVENTION

Briefly described, present invention provides a linear motor driven film gate for a motion picture telecine. A housing associated with a telecine optical block supports and transports a single film frame in a precisely controlled linear motion past a frame aperture for scanning into a CCD line array. A telecine entry guide sprocket receives the film from a feed spool and directs the film to a frame aperture plate on the film gate.

A pin registration solenoid causes registration pins on a film transport carriage to engage with the film sprocket holes. A precision linear motor with integrated optical position encoder pulls a single frame from an initial position across the scanning aperture with the film transport carriage. When a single frame has passed by the frame aperture, the linear motor stops. The linear motor then operates in the reverse direction to back up the film a predetermined amount to compensate for overshoot during the deceleration interval and to provide sufficient film leading for accelerating the film up to speed before passing the next frame by the scanning aperture.

The components of the film gate are mounted to a removable housing for supporting and transporting the film in start/stop motion past a scanning means on the telecine. The housing includes a frame aperture or slit operative for receiving light from the telecine's light source, passing the light through the film, and directing the light to the telecine's light detector.

More particularly described, the present invention is a pin registered linear motion film gate for a motion picture telecine, comprising a housing for supporting and transporting a film past a scanning means on the telecine, the housing including an aperture operative for receiving light from a light source that passes through the film and directing the light to the telecine scanning means. A selectably engageable pin assembly including at least one registration pin is provided for engaging with at least one film sprocket perforation. A linear motor is provided for moving the pin assembly in a precise linear motion to transport a frame of the film past the aperture.

The preferred pin assembly comprises a pair of oppositely disposed registration pins operative for simultaneous perpendicular engagement with a pair of oppositely disposed film sprocket perforations. The preferred registration pins are shaped substantially in accordance with both the lateral and longitudinal dimensional specifications for the film sprocket perforations. The pin assembly further comprises a linearly movable and retractable pin support arm mounted for perpendicular movement relative to the aperture plate and linear movement in the direction of film travel; the pin support arm carries the registration pins. The aperture plate includes pin grooves defined in the surface of the aperture plate. A linear actuator is provided for moving the pin support arm and the registration pins to engage the pins with the film sprocket perforation and into the pin grooves. The film is pulled along by moving the registration pins as they extend into and travel along the pin grooves.

The assembly preferably includes a pair of elongate parallel film edge guides, mounted adjacent the aperture plate, for confining the film as it travels past the aperture. The aperture plate comprises a surface milled to provide pin grooves, which are operative for receiving the registration pins after engagement with the film sprocket perforations.

The aperture plate preferably further includes a pair of elongate skid rails milled into the surface of the housing for slidably supporting the film edges, the skid rails being elevated relative to the surface of the aperture plate to support the imaged portion of the film off of the surface, to minimize wear and tear on the film.

According to another aspect of the invention, the pin assembly for engaging with the film sprocket holes and moving the film along a linear path comprises a transport plate affixed to the linear motor and operative for linear travel in the direction of film travel. A registration pin main support arm is affixed to the transport plate and is movable therewith. A retractable pin support arm is provided for mounting the registration pins in operative juxtaposition with the film sprocket perforations. A linear actuator is mounted to the housing for moving the retractable pin support arm and associated pins into and out of engagement with the film sprocket holes. A guide rod is affixed to the linear actuator extending in the direction of film travel. A retractable sliding sleeve is slidingly engaged with the guide rod and affixed to the retractable pin support arm. The sliding sleeve travels along the guide rod and is operative in response to actuation of the linear actuator for moving the pin support arm to engage the registration pins in the film sprocket perforations.

Also provided is a perforation detector for detecting alignment of the registration pins with the film sprocket perforation.

According to yet another aspect of the invention, there is provided a film stabilizing means positioned proximate to the film gate for stabilizing the film as it is moved through the film gate along a planar pathway. The disclosed film stabilizing means comprises an entry sprocket positioned adjacent to the film gate for guiding the film into the film gate. The entry sprocket includes a ring of first sprocket teeth and a ring of second sprocket teeth, at least one of the rings of the sprocket teeth being sized and shaped substantially in accordance with both the lateral and longitudinal dimensional specifications for the film sprocket holes. The entry sprocket is mounted such that the film contacts with a circumferential portion of the entry sprocket and exits the entry sprocket and onto the planar pathway. The sprocket imparts stability to the film as it enters the film gate and assists in positive registration and alignment of the pins with the sprocket holes, as well as during movement of the film.

Also disclosed is a method for scanning a frame of film in a telecine in a start/stop type motion. The disclosed method comprises the steps of engaging at least one registration pin in a film sprocket perforation of the film to be scanned, the registration pin shaped substantially in accordance with both the lateral and longitudinal dimensional specifications for the film sprocket perforation, and moving the registration pin as so engaged with the film along a linear path at a constant rate to move a frame of film past the scanning aperture. The steps of the method are carried out with a film gate comprising an aperture plate including the scanning aperture, a linear motor that transports the registration pin along the linear path, and a pin assembly for engaging the registration pin with the film sprocket perforation along a path perpendicular to the plane of the film.

According to another aspect, the method may include the further step of stabilizing the film with a precision milled entry sprocket prior to introducing the film into the film gate. The step of stabilizing the film comprises engaging the film with an entry sprocket positioned adjacent to the film gate for guiding the film into the film gate, the entry sprocket including a ring of first sprocket teeth and a ring of second sprocket teeth, at least one of the rings of the sprocket teeth being sized and shaped substantially in accordance with both the lateral and longitudinal dimensional specifications for the film sprocket perforations.

In the methods which involve sprocket-based film stabilization in conjunction with linear movement, the sprocket may be mounted such that the film contacts with a circumferential portion of the sprocket and exits the entry sprocket and onto the planar pathway of the film gate. The described sprocket comprises a free rolling sprocket whose teeth dimensions conform to ANSI standards for motion picture safety film, with Bell & Howell (B&H) perforations and Kodak rounded (KR) corners. The dimensions of the teeth of the sprocket are preferably maintained within a tolerance of ±10 microns relative to predetermined standards for the film sprocket perforations.

The preferred method further comprises the step of engaging the film with a plurality of oppositely disposed registration pins operative for simultaneous perpendicular engagement with a pair of oppositely disposed film sprocket perforations. Further still, the method comprises the steps of detecting when the registration pins are aligned with the center of film sprocket perforation with a perforation detector; and in response to a detection of pin alignment, moving the registration pins along a path perpendicular to the plane of the film and into engagement with the film sprocket perforations.

In the disclosed embodiment, the registration pins are affixed to a linearly movable and retractable pin support arm mounted for perpendicular movement relative to the aperture plate and linear movement in the direction of film travel. The aperture plate includes a pin groove defined in the surface thereof. With such components, the preferred method includes the steps of moving the pin support arm and associated registration pins to engage the registration pin into engagement with the film sprocket perforation and into the pin groove, and moving the pin support arm and associated registration pin along the linear path with the registration pin engaged with the film sprocket perforation and extending into the pin groove.

The preferred method further comprises the step of supporting the perforated edges of the film in an elevated position relative to the aperture plate to maintain the imaged portion of the film in a spaced apart relation to the aperture plate, to minimize wear and tear on the film. The step of supporting the perforated edges of the film is carried out by a pair of elongate skid rails defined in the aperture plate.

The preferred method further comprises the steps of accelerating the film to the constant rate prior to the point at which the frame to be scanned first passes the scanning aperture, maintaining the film at the constant rate while the frame is scanned at the scanning aperture, and decelerating the film to a stop after the frame has past the scanning aperture. Also provided is the step of backing up the film a predetermined distance relative to the scanning aperture to provide film leading for acceleration and counteract any overshoot.

The preferred method further comprises the steps of disengaging the registration pins from the film sprocket perforations after scanning the film frame, reversing the linear motor after the registration pin is disengaged from the film sprocket perforation to return the registration pin to an initial position, detecting when the registration pins are in alignment with a subsequent film sprocket perforation displaced a predetermined distance from an initial film sprocket perforation, and re-engaging the registration pins when the pins are in alignment with the subsequent film sprocket perforations.

If the telecine includes a motor driven capstan, the telecine capstan motor may be employed to hold the film steady during return movement of the film transport carriage and maintain pin alignment. To provide such operation, the film may be threaded around the telecine capstan after leaving the film gate to firmly engage the film with the capstan. The capstan's motor drive may be disabled (de-energized) with control signals when the pins are in engagement with the film sprocket perforation so that the film will move freely from the supply reel and onto the take up reel. The capstan's motor drive may be re-enabled (re-energized) to hold the film stationary during the steps of disengaging the pins, reversing the linear motor, detecting pin alignment, and re-engaging the registration pin.

Accordingly, it is an object of the present invention to provide an improved start/stop motion film gate for a motion picture telecine.

It is another object of the present invention to provide a linear motor driven film gate for a telecine that supports and guides a motion picture film in a stable, linear motion with low distortion as it passes across a telecine scanning aperture.

It is another object of the present invention to provide an improved start/stop motion film gate for a telecine that positively registers at least one series of film perforations with precision milled registration pins and moves the film with the pins with a precise linear motion to impart lateral and longitudinal stability to the film while it is transported and scanned.

These and other objects, features, and advantages of the present invention will become more clear upon reference to the accompanying drawings and the following detailed description.

BRIEF DESCRIPTION OF THE DRAWING FIGURES

FIG. 1 schematically illustrates the process of transferring a motion picture film to a video signal in a telecine, and shows the position and function of a film gate in the telecine.

DETAILED DESCRIPTION OF THE PREFERRED EMBODIMENT

Figure 1:
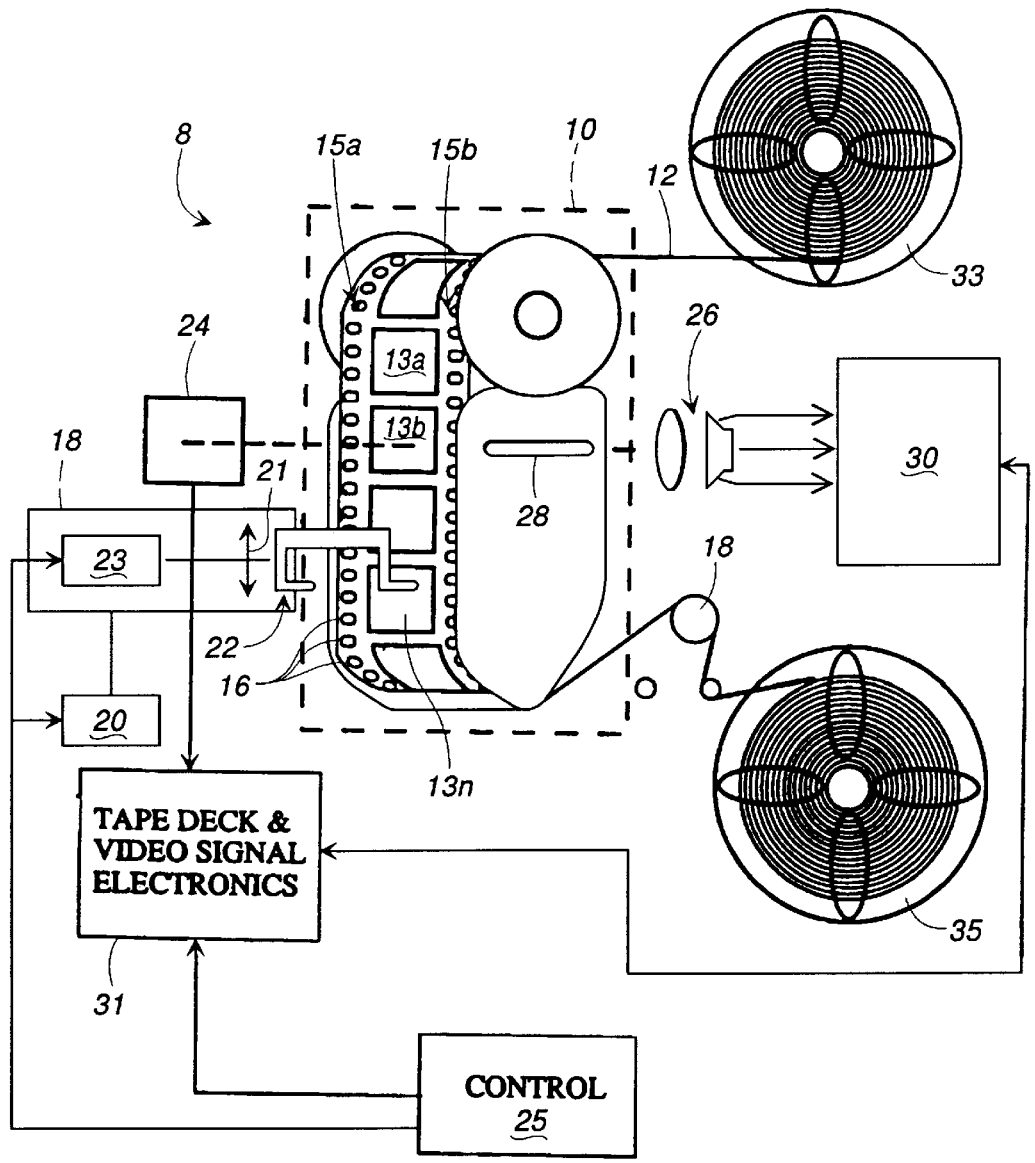

Referring now to the drawings, in which like numerals indicate like elements throughout the several views, FIG. 1 schematically illustrates a motion picture telecine 8 that incorporates the preferred embodiment of a linear motor driven start/stop motion film gate 10 constructed in accordance with the present invention. As will be known to those skilled in the art, a telecine such as the one 8 illustrated in FIG. 1 is commonly used for film-to-video tape transfers. These film-to-tape transfers are conducted by scanning a film 12, typically 35 mm or 16 mm movie film, by a light source. The film 12 is provided from a supply reel 33 to the film gate 10, which supports the film during scanning. The film 12 will be understood to comprise a plurality of frames 13a, 13b, ... 13n supported on the substrate of the film. The film 12 also includes two rows 15a, 15b of perforations or sprocket holes 16, one row along each longitudinal edge of the film. However, those skilled in the art will understand that some kinds of film have only a single row of perforations along only one longitudinal edge of the film.

In the disclosed embodiment, the film 12 is pulled through the gate 10 by a film transport mechanism or carriage 18 driven by a linear motor 20. The carriage 18 moves along the length of the film, in the direction of arrows 21, transporting the film one frame at a time, powered by the linear motor 20. To move the film, a registration pin assembly 22 comprising precision milled registration pins is engaged with the film sprocket holes, and then the linear motor is actuated to move the film. The registration pin assembly 22 is moved into engagement with the film sprocket holes via a solenoid 23.

The telecine 8 further includes a source of light 24 such as a cathode ray tube (CRT), laser light, or light bulb. A control circuit 25 is connected to the linear motor 20 and the solenoid 23 to control the scanning of each film frame 13. The light from the light source 24 passes through the film, through a light or frame aperture 28 in the film gate 10, through a lens assembly 26, and onto a light detecting means or "cell box" 30. The lens assembly 26 focuses the light from the light source onto the light detecting means. The light detecting means or cell box 30 produces a video signal corresponding to the image on the film. The video signal is typically provided to a magnetic tape recorder or deck 31. The control circuit 25 also controls the recording of the image on the tape deck.

A typical telecine of the type with which the present invention is useful is a line array CCD telecine such as a QUADRA model telecine manufactured and sold by Philips Broadcast Television Systems GmbH.

Those skilled in the art will understand that in the television production and post-production industry, film-to-tape transfer telecine apparatus are often used in conjunction with fresh 35 mm motion picture film that has recently been exposed and obtained from a motion picture camera. This is in contrast to telecine devices operative with theater release film prints that include sprocket holes manufactured to a different specification. Motion picture camera film typically is manufactured to ANSI Standard PH22.93-1980, with Bell & Howell (B&H) perforations, which specification is incorporated herein by reference. Currently popular camera film includes the improved Kodak rounded ("KR") perforations with 0.005 inch corner radii for minimizing the weakness for tearing at the corners of the film perforations.

It should be understood at this juncture that films not intended for use in pin registration systems, for example 35 mm color print film incorporating Kodak standard (KS) perforations, being typically used only for release or theater prints, may not benefit from the advantages provided by the present invention with the use of 35 mm color negative film.

Figure 2:
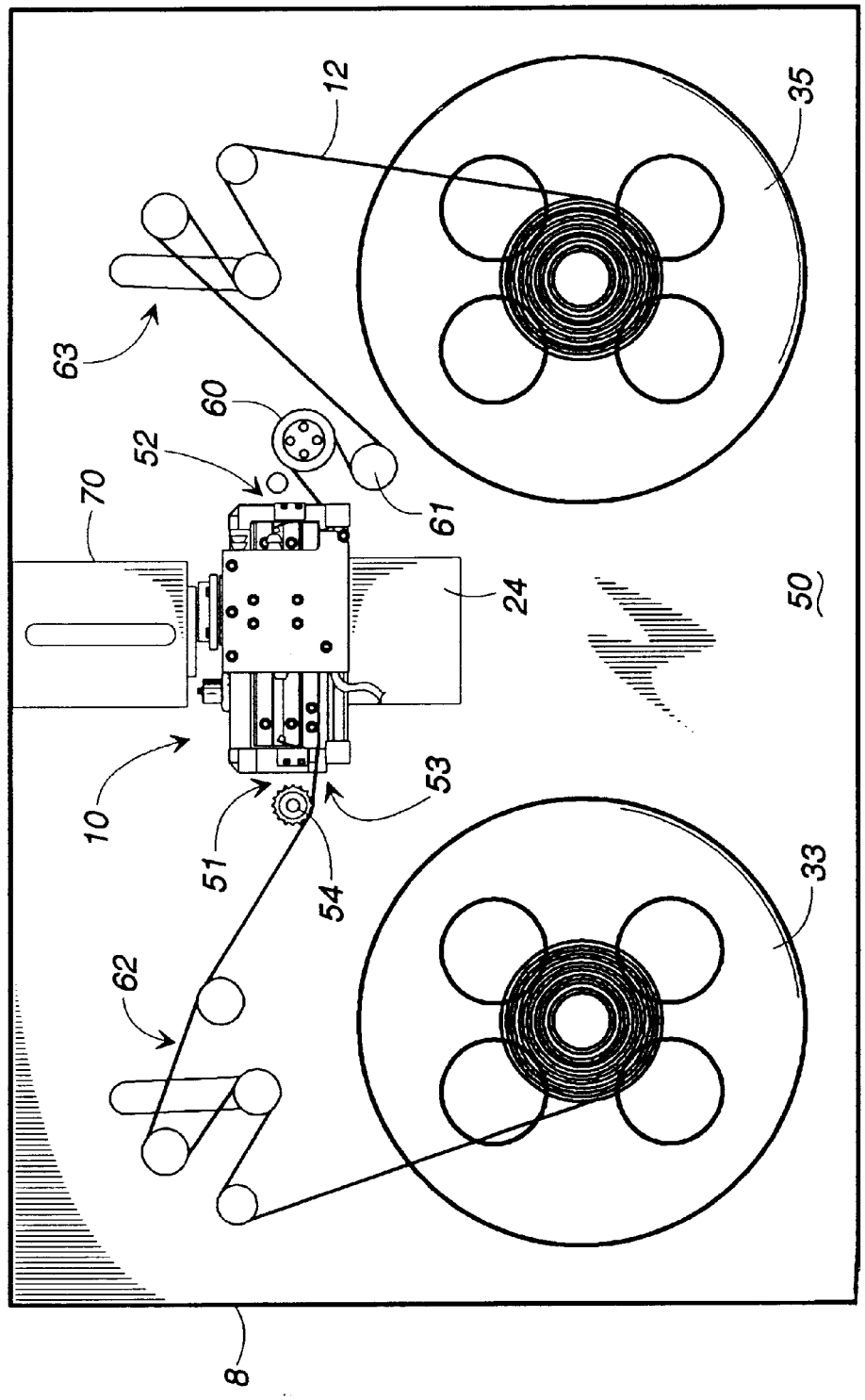
FIG. 2 illustrates the front panel of a typical motion picture telecine with which the present invention is used, showing the placement of the preferred embodiment of a linear motor film gate constructed in accordance with the present invention.

FIG. 2 illustrates the front panel 50 of a CCD line array telecine 8 incorporating the preferred embodiment of a start/stop linear motor driven motion film gate 10 constructed in accordance with the present invention. The film 12 is supplied from a supply reel 33 to the film gate 10. The film enters the film gate 10 at an entry end 51 of the film gate, through the film gate 10, and thence from an exit end 52. The film is then guided to the capstan 60 of the telecine, around an idler roller 61, and thence to the takeup reel 35.

Although not forming a part of the present invention, it will be understood that the film is fed from the supply reel 33 through a tensioning mechanism 62 prior to admission into the film gate, and through a separate tensioning mechanism 63 after leaving the capstan before takeup on the take up reel 35. Such tensioning mechanisms 62, 63 comprise idler rollers and tensioning arms, the construction and operation of which will be known to those skilled in the art.

Furthermore, it will be understood that some telecine models may include a guide sprocket 54 positioned prior to (or in some cases subsequent to) the film gate 10. The present invention is suitable for operation with such telecines, and the guide sprockets may either be employed to provide further stability to the movement of the film or may be bypassed, as necessary or desirable.

The film 12 is inserted into the film gate 10 at an entry loading slit 53 provided in a panel of the film gate. The entry loading slit allows the film to be inserted along a pathway substantially parallel to the horizontal pathway of the film across the frame aperture, thereby providing for convenient and quick loading of the film gate.

Still referring to FIG. 2, a telecine optical block or housing 70 is mounted to the front panel 50 of the telecine and receives light transmitted through a film frame that is scanned. A lamp 24 or other light source on the telecine directs light through the film mounted in the film gate 10 and into the optical block 70. The lens assembly 26 and light detecting means 30 is housed in the telecine optical block or housing 70. In the known manner, the light is directed through the internal lens assembly 26 and thence into the light detecting means 30.

The lamp 24 and light detecting means 30 comprise a film scanning means associated with the telecine. Inasmuch as the construction and operation of the scanning means and other aspects of the telecine 8 do not form a part of the present invention, further discussion of same will not be provided herein.

Figure 3:
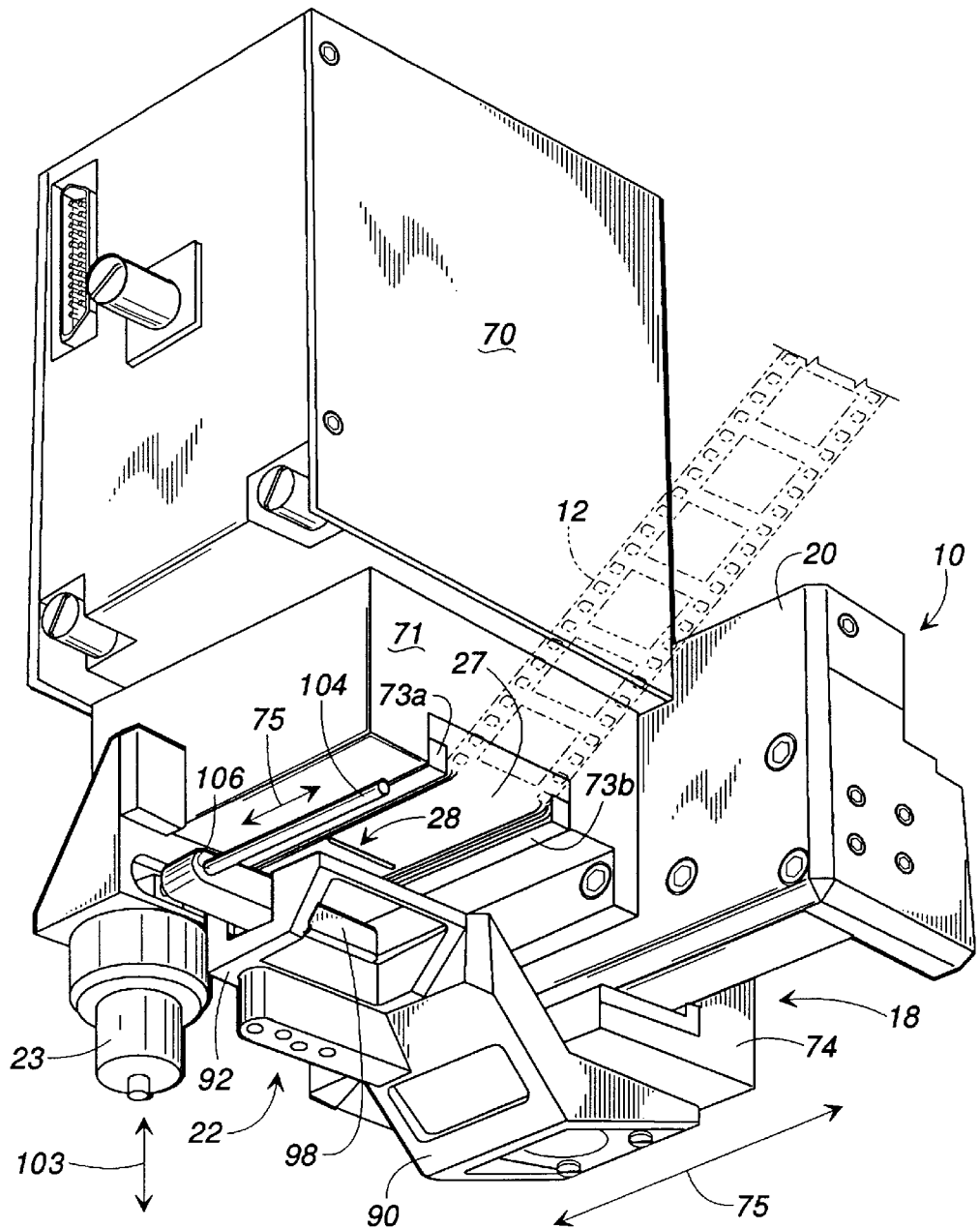
FIG. 3 is a perspective rear underneath view of a linear motor film gate constructed in accordance with the preferred embodiment of the present invention, showing the film transport carriage.

Referring next to FIG. 3, the preferred film gate 10 comprises a linear drive motor 20 in combination with several precision milled guides, sprockets, and rollers that individually, and in combination, stabilize the film as it is transported across an aperture plate 27 and moves past a frame aperture 28. The frame aperture 28 is a generally rectangular slit milled into a horizontally-disposed surface of the film gate 10, through which light can pass and be directed into the telecine optical block 70.

The preferred embodiment of the film gate 10 is physically mounted to and underneath the telecine optical block 70 for supporting and transporting the film 12 in start/stop motion. The housing 70 supports a film guide block 71 that is milled to form a film path and confine the film within lateral edge guides 73a, 73b and across the aperture plate 27. The aperture plate 27, defined or mounted between the edge guides 73a, 73b, includes a line aperture 28 defined therein for transmitting light from the light source 24 (not shown in FIG. 3) through a frame on the film and thence into the optical block 70. Preferably, the leading (not shown in FIG. 3) and trailing edges of the aperture plate 27 are smoothly rounded to guide the film on and off at an angle.

The film gate 10 further comprises a linear motor 20, and an integral linear optical position encoder 72 (not visible in FIG. 3). The linear motor 20 is mounted to the front of the film gate and includes a transport mounting plate 74 that moves linearly in the direction of arrows 75. The transport mounting plate 74 extends underneath the telecine optical block 70 and supports the registration pin assembly 22. The registration pin assembly comprises a registration pin main support arm 90 that supports a retractable pin support arm 98, that in turn mounts film registration pins (not visible in FIG. 3). The retractable pin support arm 98 is supported within a laterally-extending portion 92 of the registration pin main support arm 90 that is disposed directly underneath the aperture plate.

The retractable pin support arm 98 and its associated pins is moved into engagement with the film by a pin solenoid 23 that is mounted to the transport mounting plate 74. The pin solenoid 23 actuates a sliding sleeve 106 to move up and down in the direction of arrows 103; in so doing the sliding sleeve moves the registration pins into and out of engagement with the film sprocket holes.

The pin solenoid 23 is mounted to the film guide block 71 and does not move. Rather, it actuates the movement of a guide rod 104 in the direction of arrows 103. The sliding sleeve 106 slides along the guide rod 104 as the linear motor moves the registration pin main support arm 90.

Figure 4:
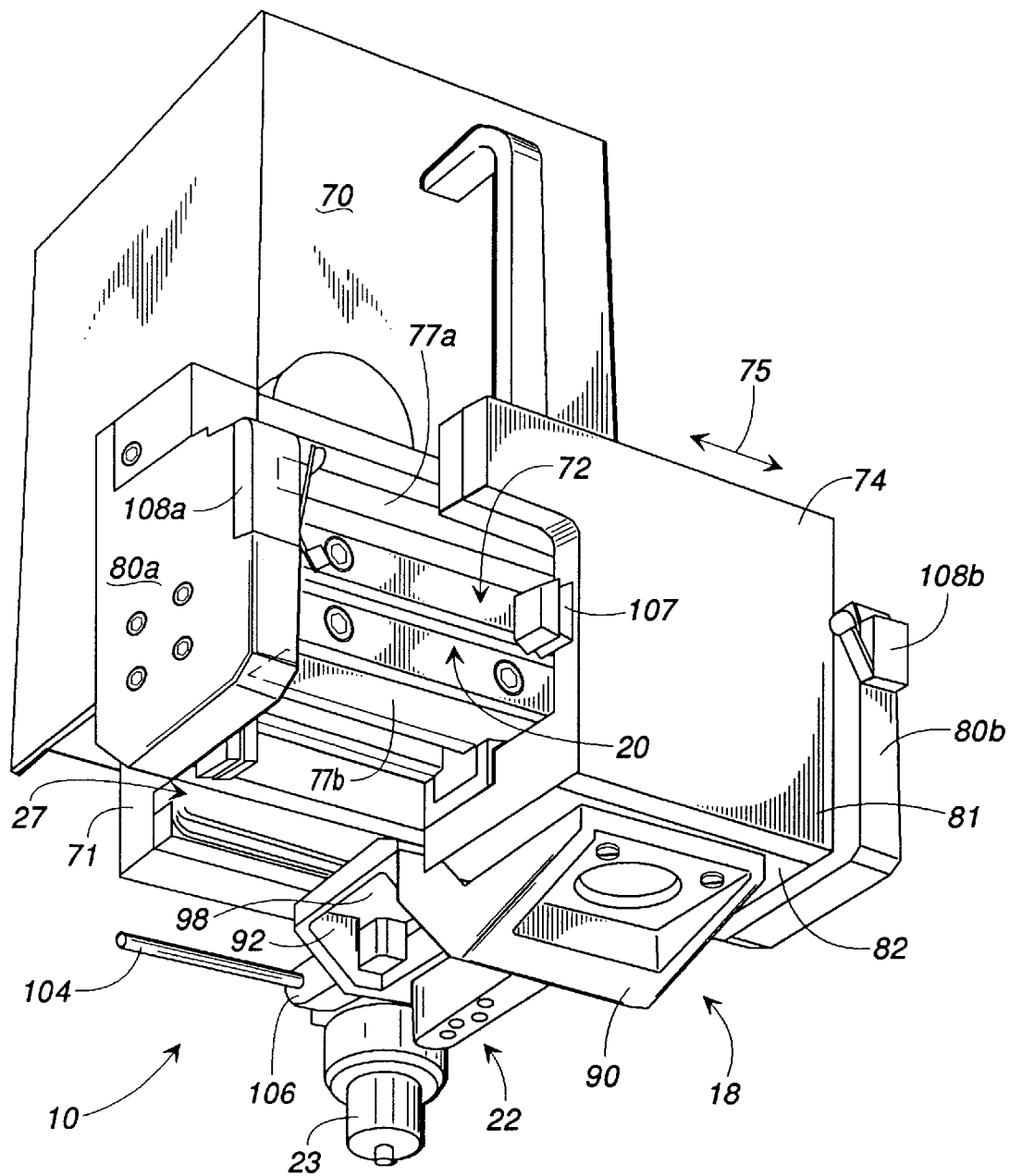
FIG. 4 is a perspective front underneath view of the linear motor film gate, showing the film transport carriage, linear motor, and linear optical position encoder.

Referring now to FIG. 4, the transport mounting plate 74 is supported for linear motion on a pair of guide rods 77a, 77b. The guide rods are supported by end plates 80a, 80b of the linear motor 20. The transport mounting plate is supported on the guide rods with precision linear bearings made by THK America, Inc., 200 East Commerce Drive, Schaumberg, Ill. 60173. A rubber bumper 107 limits the lateral travel of the linear motor and the associated transport plate 74. Limit switches 108a, 108b are actuated if the linear motor reaches the lateral extents of its motion, and provide signals to the control circuitry.

The preferred motor 20 is a linear motor made by Trilogy Systems Corp., Webster, Tex., that provides a velocity over the relevant range of motion that is constant to 0.01 percent (%), i.e. 1/100 of one percent, with a maximum velocity of up to 227 mm/sec, synchronized to a predetermined synchronization signal generated as a function of the line scanning rate. The synchronized motion is coordinated with control signals from the control circuitry 25 (FIG. 1).

The transport mounting plate 74 also supports the position detecting element of a linear optical position encoder 72 that provides signals indicative of the instantaneous position of the transport mounting plate; the encoder main body is mounted to the linear motor 20. The preferred optical position encoder 72 is a model LS 405 sealed linear position encoder made by Dr. Johannes Heidenhain GmbH, located at Dr.-Johannes-Heidenhain-Strasse 5, D- 83301 Traunreut, Germany. The preferred encoder utilizes a glass scale with a Diadur grating and provides a grating pitch of 0.1 micrometers. The measuring lengths of such encoders vary, but in the preferred embodiment a 180 millimeters (mm) encoder was utilized. This is greater than the full range of motion of the linear motor, and thereby has more than adequate linear range.

The film guide block 71 and its associated aperture plate 27 is mounted to the optical block 70 so that a registration pin main support arm 90 mounted to the transport mounting plate 74 extends over the film aperture. The transport mounting plate 74 is generally L-shaped, and has a side portion 81 and a bottom portion 82. The side portion 81 supports the bearings that ride on the guide rods 77. The bottom portion 82 provides an attachment surface for the registration pin main support arm 90, which is fastened by screws or equivalent fastening means.

The registration pin main support arm 90 extends across the bottom of the film gate, and angles upwardly to the lateral portion 92 that houses a pair of registration pins (not shown). The lateral portion 92 extends over the aperture plate 27.

Figure 5:
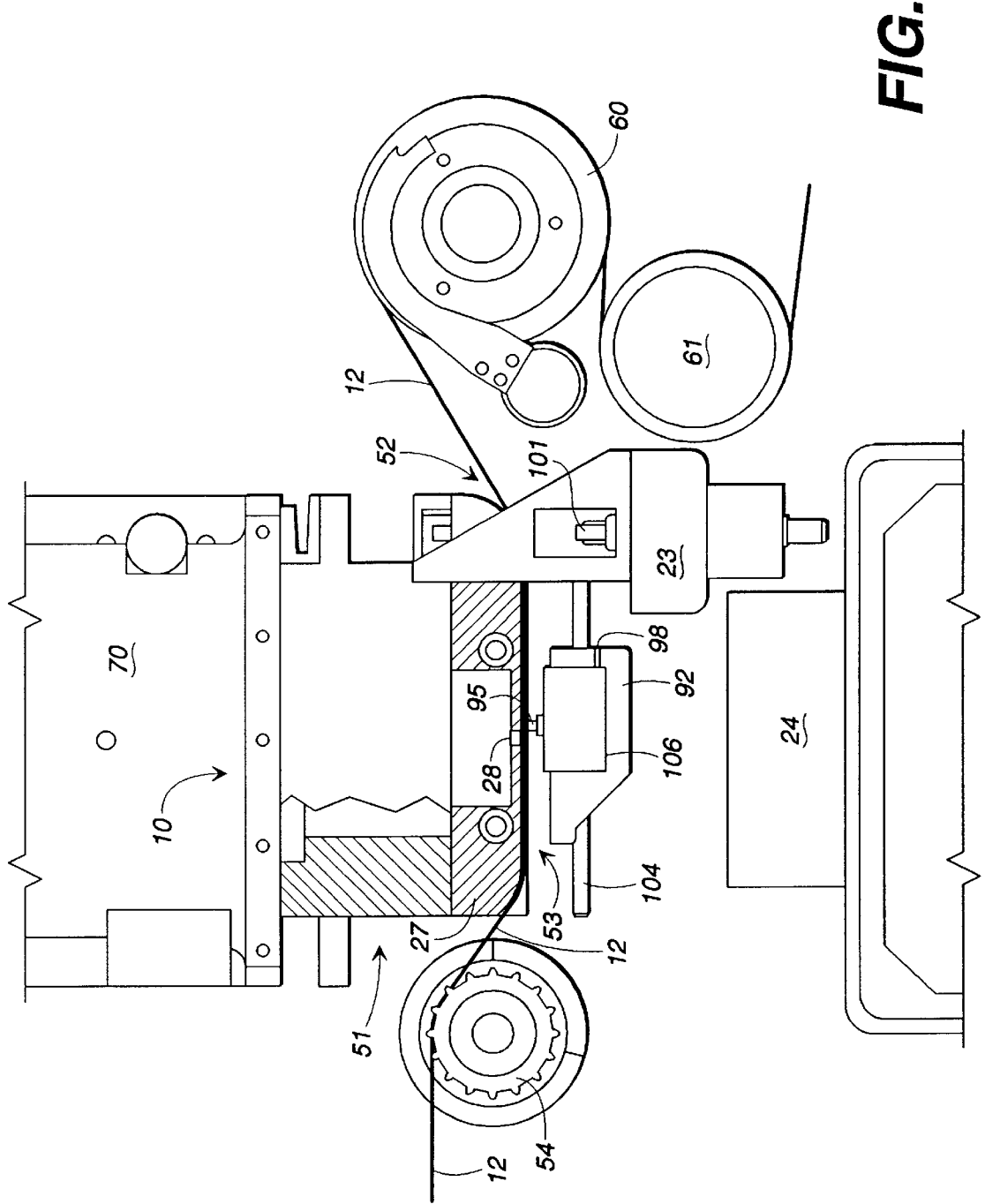
FIG. 5 is a front elevational view of the preferred aperture plate, together with telecine entry sprocket and telecine capstan.

Referring now to FIG. 5, the registration pins 95 are mounted for vertical movement relative to the aperture plate 27. The pins 95 are supported on the retractable pin support arm 98, which is housed for vertical movement relative to the lateral portion 92 of the registration pin main support arm 90. This vertical movement is caused by the pin solenoid 23.

As mentioned, the pin solenoid 23 is mounted to the film guide block 71 and does not move laterally relative to the film. The actuator rod 101 of the solenoid 23 is affixed to and supports the guide rod 104 that extends laterally and parallel to the path of travel of the film The sliding sleeve 106 is affixed to the retractable pin support arm 98 and extends outwardly of the lateral portion 92 of the registration pin main support arm 90 to slidingly house the guide rod. In this manner, the retractable pin support arm 98 travels along and is laterally guided by the guide rod 104.

When the pin solenoid 23 actuates, it causes the retractable pin support arm 98 to move (raise in the disclosed embodiment), engaging the registration pins 95 into sprocket holes or perforations of the film. The retractable pin support arm 98 moves along the guide rod, keeping it aligned with the path of travel of the film.

Still referring to FIG. 5, and as mentioned in connection with FIG. 2, in some embodiments a telecine entry sprocket 54 may be provided. If so employed, the film 12 may be fed over the guide sprocket for additional stability prior to entry into the film gate. In such an embodiment, the film 12 passes over the telecine sprocket 54 and enters the entry end 51 of the film gate 10. The film is guided onto the aperture plate 27, after being threaded into the loading slit 53 during loading. The film then passes under the aperture slit 28, above the retractable pin support arm 98. It then passes out of the exit end 52 of the film gate, and thence upwardly to the telecine capstan 60. After passing around the capstan, the film is guided around the roller 61. The roller 61 guides the film to the take-up reel (not shown).

If employed, the entry guide sprocket 54 on the telecine receives the film from the supply reel 33, edge-stabilizes the film, and directs the film to the aperture plate 27. The entry sprocket is positioned prior to the aperture and directs the film into the film gate. The preferred entry guide sprocket 54 includes a ring of first sprocket teeth and a ring of second sprocket teeth. The first sprocket teeth are sized and shaped substantially in accordance with and to the tolerances of both the lateral and longitudinal dimensional specifications for the film sprocket holes, as established by film industry standards. The second sprocket teeth are sized and shaped substantially in accordance with and to the tolerances of the longitudinal dimensional specifications for the film sprocket holes. The preferred sprocket is made in accordance with the sprockets described in U.S. Pat. No. 5,266,979 to Brown et al., the disclosure of which is incorporated by reference herein and made a part hereof.

Figure 6:
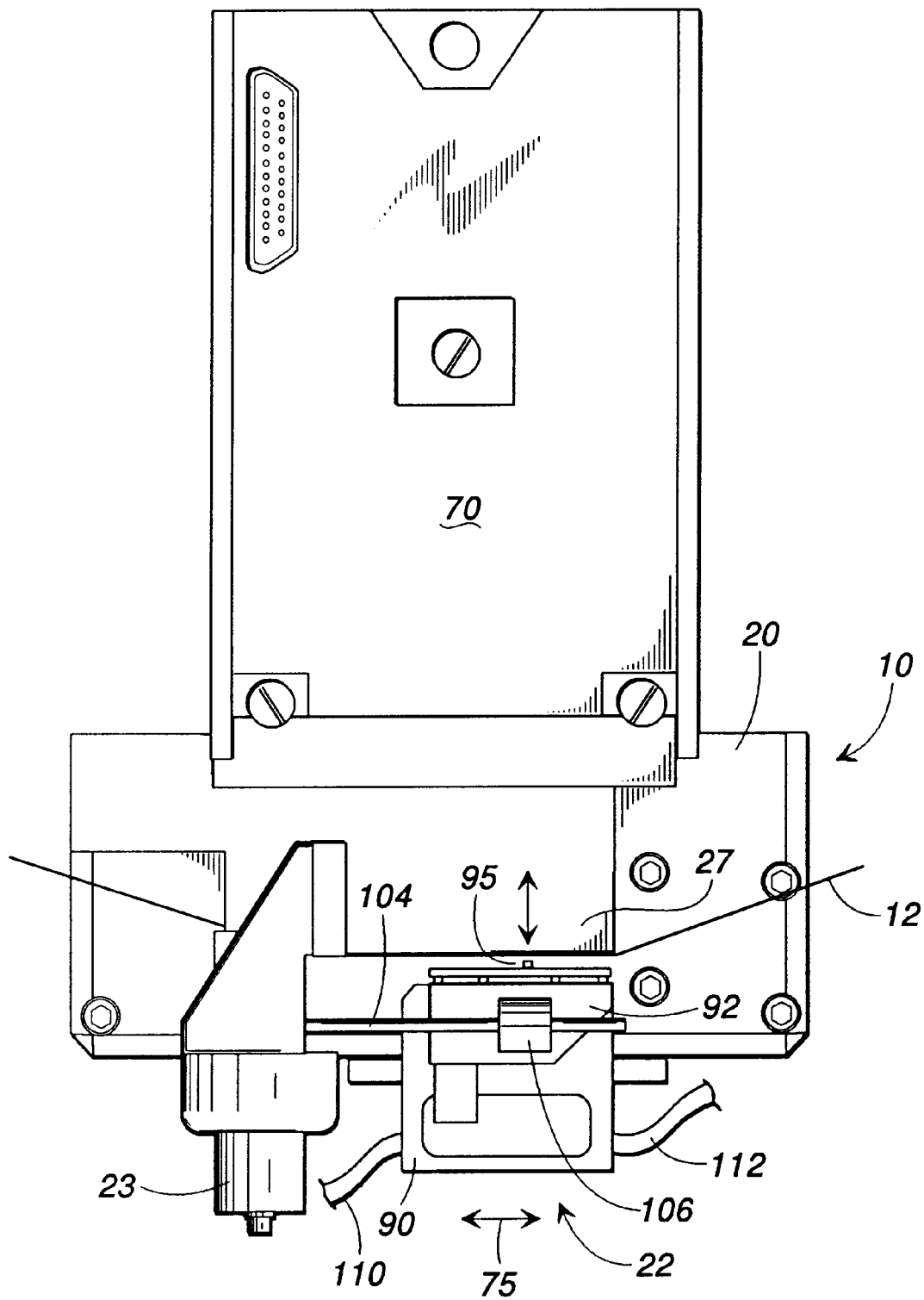
FIG. 6 is a rear plan view of the preferred linear motor film gate.
Figure 7:
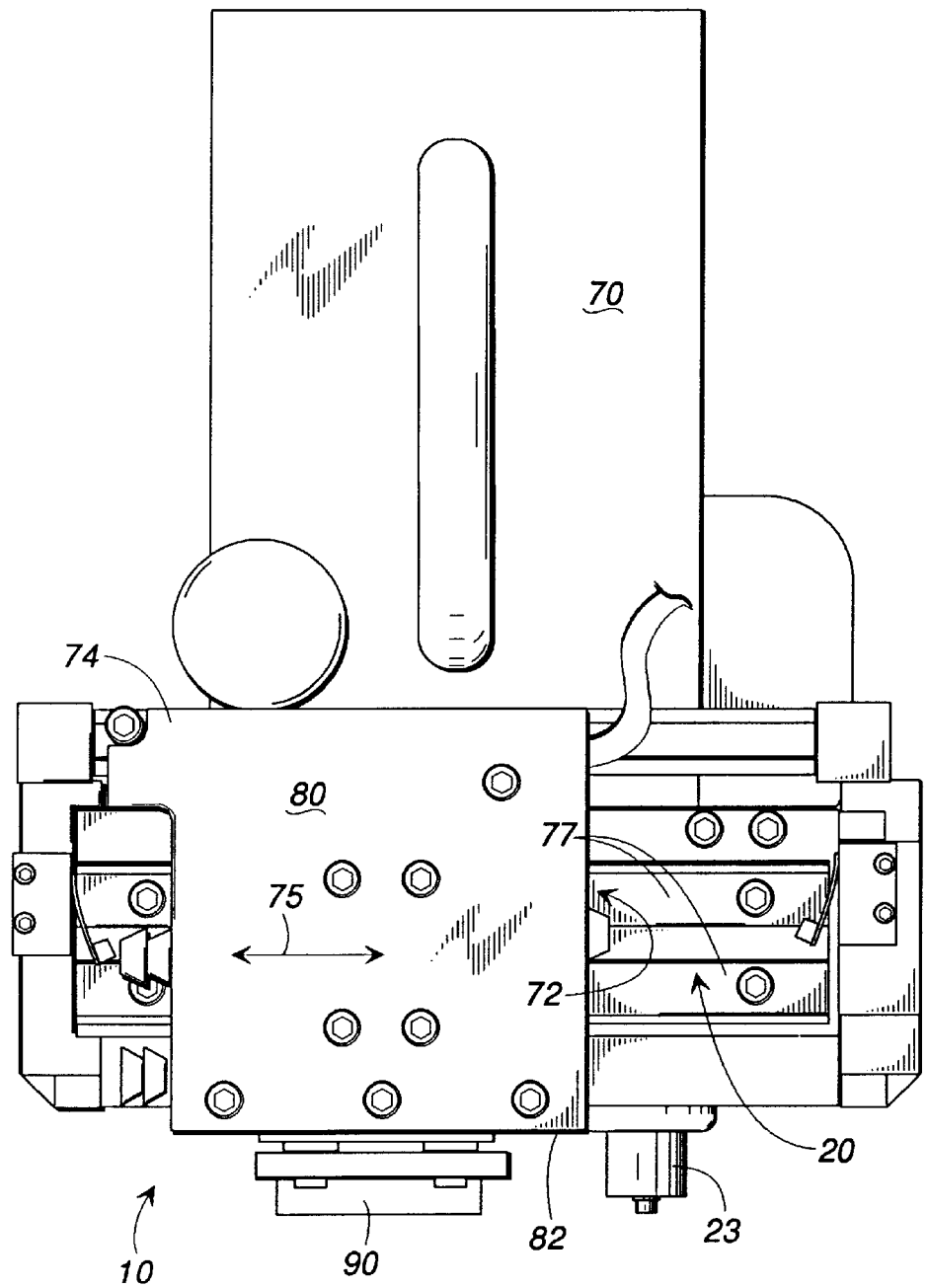
FIG. 7 is a front plan view of the preferred linear motor film gate.
Figure 8:
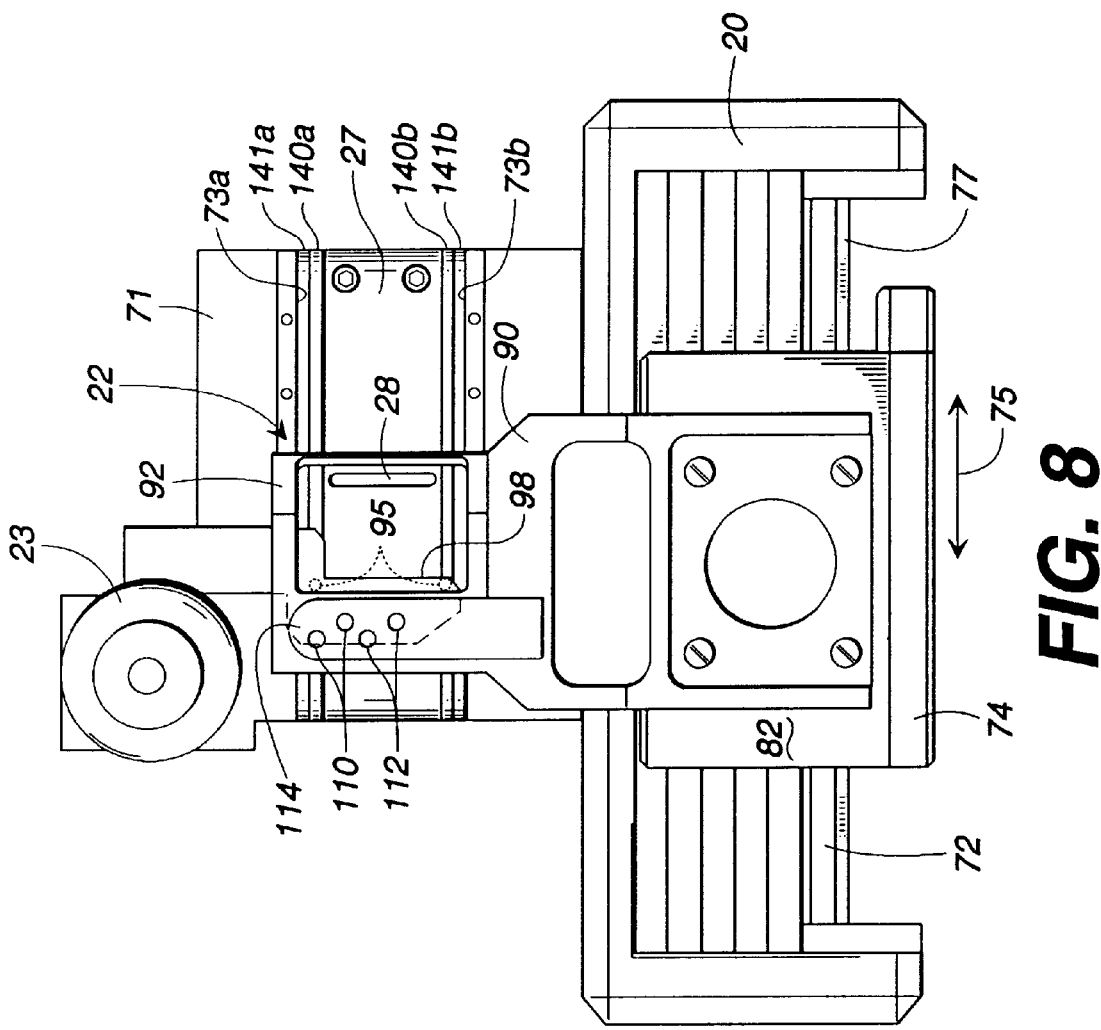
FIG. 8 is a bottom plan view of the preferred linear motor film gate.

Referring now to FIG. 6 in conjunction with FIG. 8, the registration pin main support arm 90 carries a pair of optical fibers 110, 112 that transport light signals and form a sensor for detecting the location of a sprocket or perforation hole in the film. The optical fibers are affixed into a light guide 114 forming a portion of the lateral portion 92 of the registration pin main support arm 90, so that light is directed upwardly and into the path traveled by the perforated edges of the film. One optical fiber 110 carries light that is projected onto the edge of the film, and the other optical fiber 112 carries reflected light back to a light detector in the control circuit 25 (FIG. 2).

The optical fiber sensor projects light upwardly from the registration pin main support arm 90 at a predetermined position displaced by a predetermined number of film perforations, e.g. two, from the registration pins 95. When a perforation passes above the sensor, the edge is detected. By detecting the location of the leading and trailing perforation edges as the registration pin main support arm 90 moves along the film, the circuit detects and calculates when the registration pins 95 are positioned exactly in the middle of a perforation. The method of detecting the center of the perforation comprises the steps of, with the film stationary, moving the carriage 18 to detect the leading edge of a film sprocket perforation hole, continuing in movement to find the trailing edge, dividing the distance by two, and, so long as the distance between edges is within a predefined error tolerance, backing up the carriage this distance to center the pins. If the error tolerance is exceeded, for example if the film perforation is torn and exceeds a reasonable tolerance, an error condition is indicated and may be signalled to the operator.

When the registration pins are determined by the circuit to be in alignment with the perforations in the film, the registration pins are moved (raised in the disclosed embodiment) into engagement with a perforation by actuating the pin solenoid 23.

Once the registration pins are in engagement with the film perforations, the motor 20 is actuated to pull a frame of film past the aperture 28 in a very precise linear motion, synchronized to a house synchronization signal. This is controlled by the control circuit 25.

After a frame of film has been pulled past the aperture 28, the film is decelerated to a stop and held in place by the capstan. The pin solenoid 23 is then deactuated, causing the registration pins 95 to be withdrawn from the perforations in the film. Once the registration pins are clear of the perforations, the linear motor is reversed to bring the motor and the registration pin main support arm back to an initial position.

Figure 9:
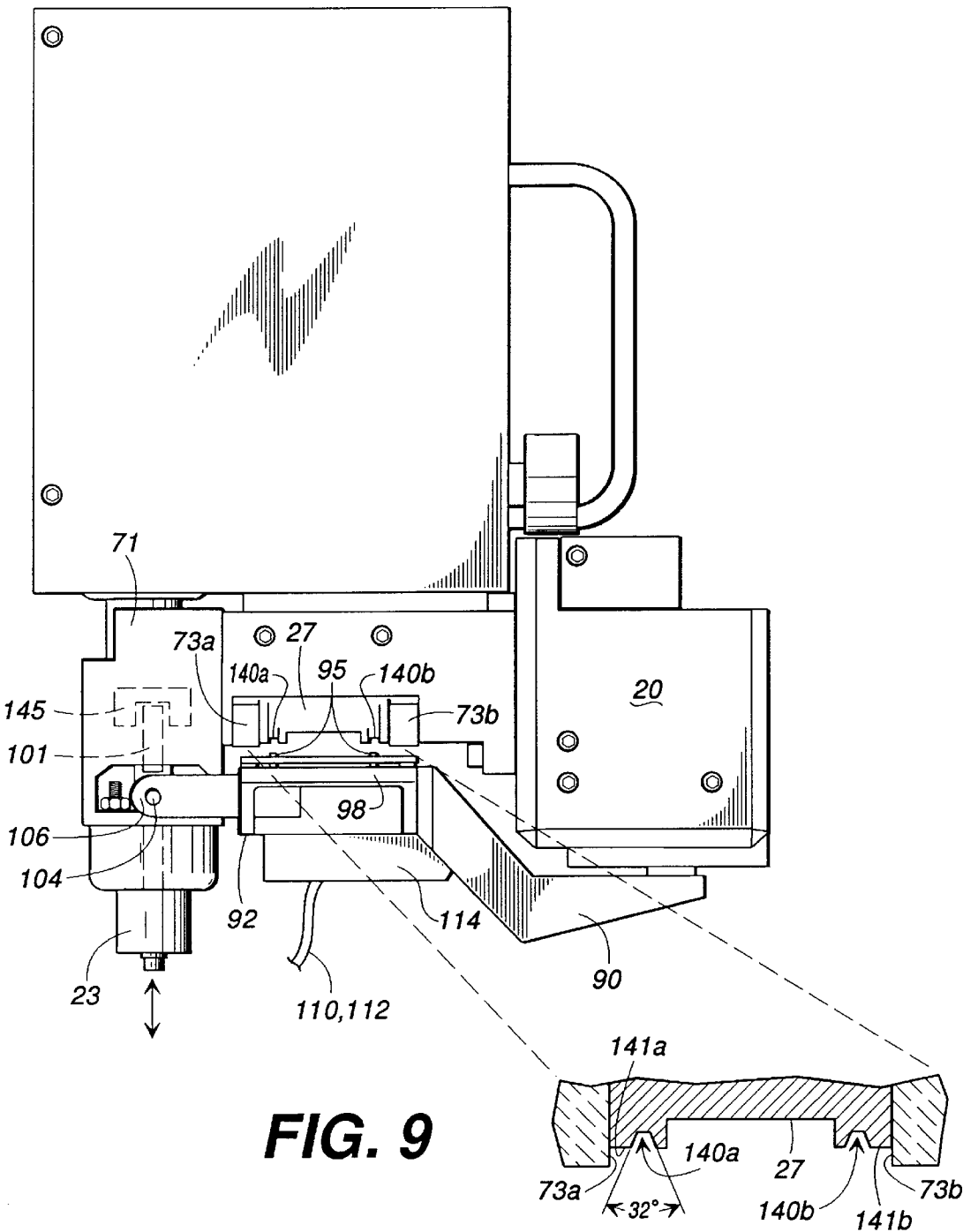
FIG. 9 is a film entry end plan view of the preferred linear motor film gate.

Referring now to FIG. 8 and FIG. 9, the film guide block 71 mounts the aperture plate 27 and corresponding edge guides 73a, 73b. As seen in FIG. 8, the aperture plate 27 is preferably milled to include a pair of elongate depressed parallel pin grooves 140a, 140b that receive the registration pins 95 as the film is transported along the aperture plate. The pin grooves 140 are preferably 0.060 inches deep ±0.001 inches with a 32 degree bevel cut relative to the surface of the aperture plate 27 and extend along the length of the aperture plate, and are 0.120 inches wide at the opening of the cut. The pin grooves are preferably at least 2.2 inches long.

The preferred aperture plate 27 further comprises a horizontal skid rail 141a for slidably supporting the film edge but not contacting the imaged portion of the film. The horizontal skid rail 141a is preferably a surface of the aperture plate 27, slightly elevated relative to the surface of the aperture plate that includes the aperture 28, and as wide as the film's edge-to-perforation region specified in the referenced ANSI standard, i.e. 0.079 inches ±0.002 inches.

Similarly, the aperture plate 27 comprises a second and parallel horizontal skid rail 141b for slidably supporting the opposite film edge. The horizontal skid rail 141b is also preferably a surface of the aperture plate 27. Preferably, the horizontal skid rails 141 are slightly tapered at the leading edges so as to minimize the likelihood of "catching" on a film splice or broken film perforation.

The aperture plate, skid rails, and pin grooves are preferably fabricated from polished stainless steel to minimize drag and wear on the film.

The edge guides 73a, 73b are preferably made of a ceramic material and are mounted to the film guide block 71 adjacent each side of the aperture plate 27, and extend slightly above the surface of the aperture plate to confine the film edges.

Figure 10:
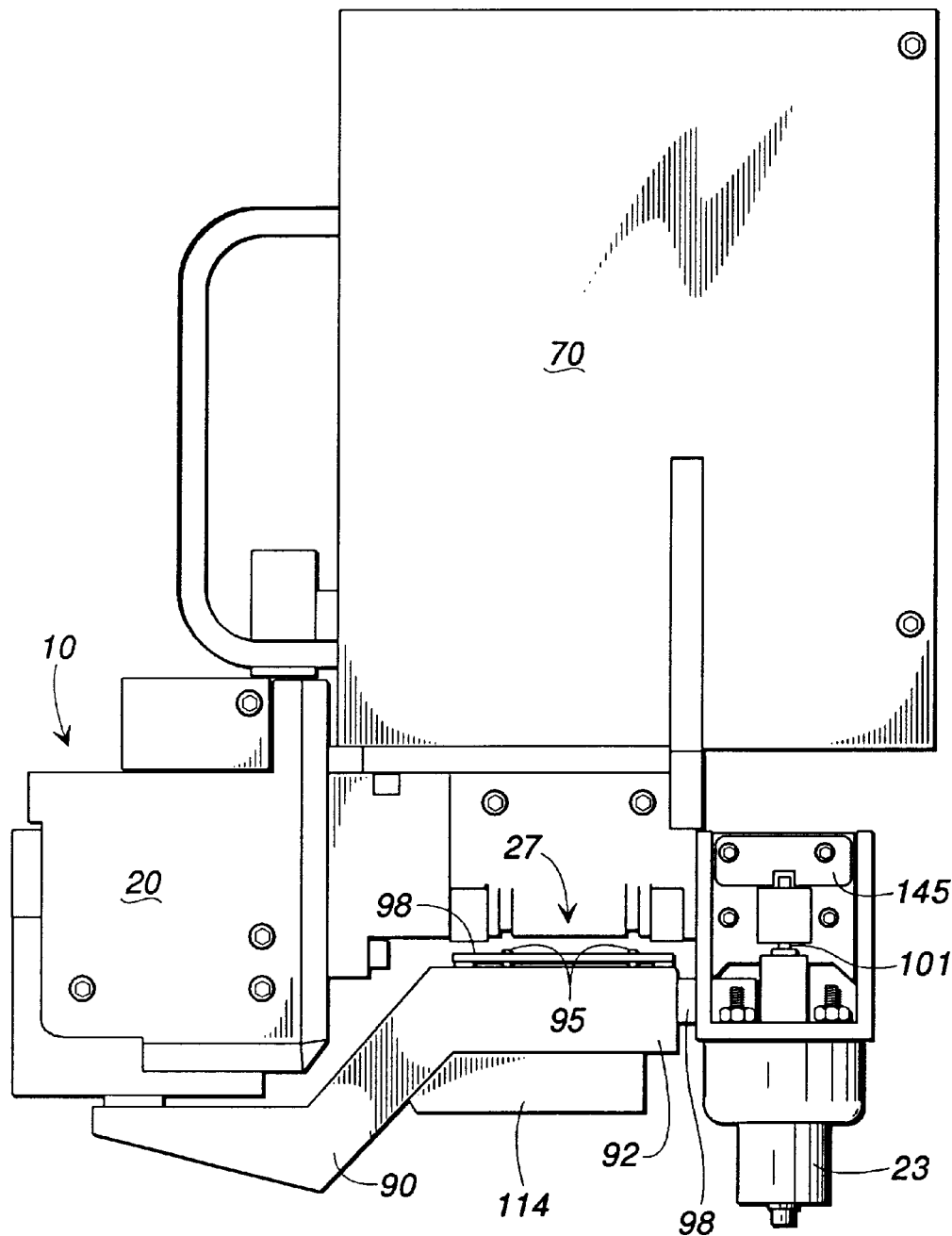
FIG. 10 is a film exit end plan view of the preferred linear motor film gate.

As best seen in FIG. 9 and FIG. 10, the motion of the pin solenoid 23 is detected by a position sensor 145 mounted to the film guide block 71. The position sensor 145 is preferably an optical sensor that is triggered when the actuator rod 101 of the pin solenoid extends into the sensor. This provides a signal indicative that the pins are in the raised (engaged) position, or alternatively in the lowered (free) position, and is used by the control circuit 25 to ensure that the film transport linear motor or telecine capstan motor is not moved at inappropriate times.

Figure 11:
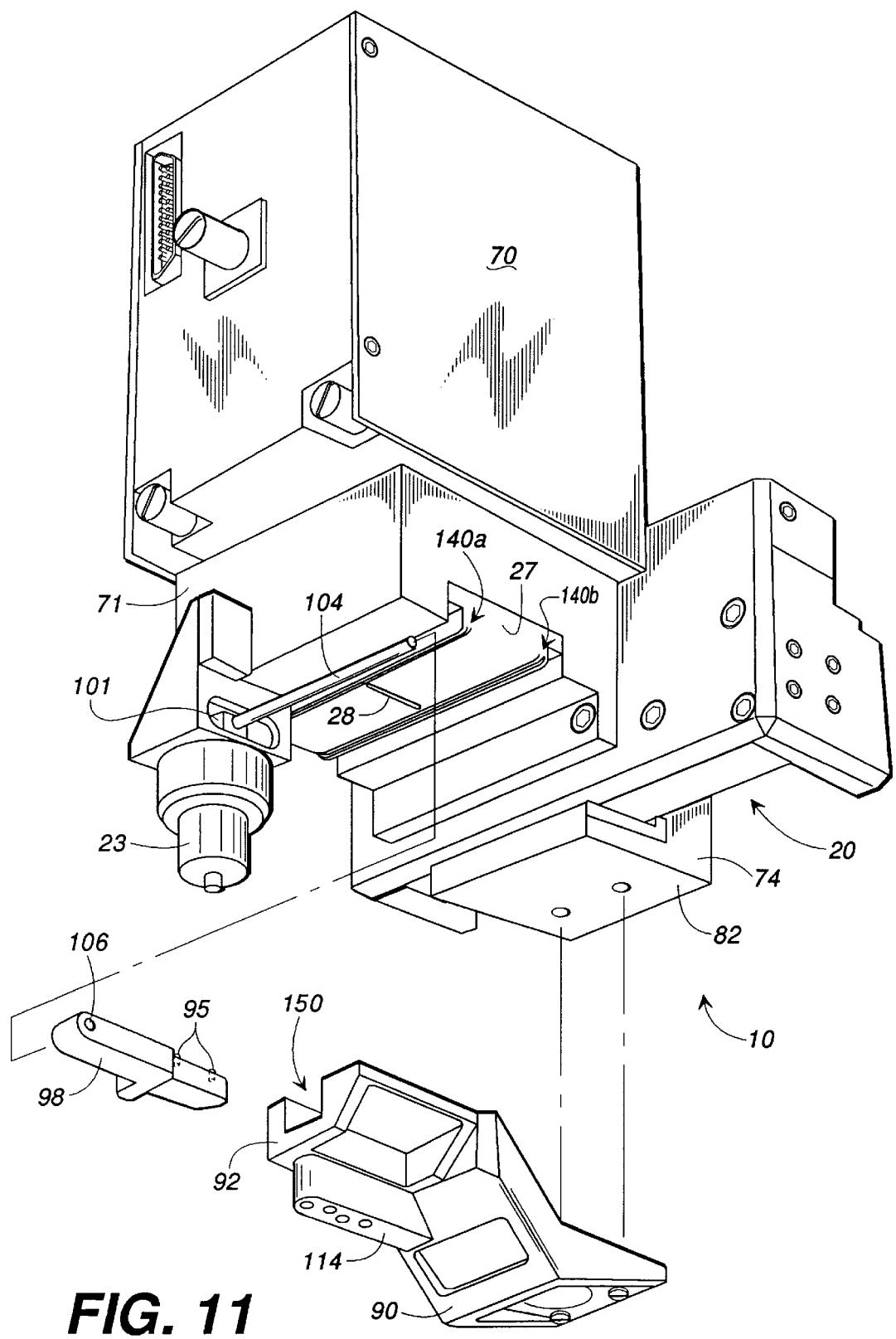
FIG. 11 is an exploded perspective view of the preferred linear motor film gate.

FIG. 11 provides an exploded view of the preferred linear motor driven start/stop film gate 10. It can be seen that the registration pin main support arm 90 is fastened to the bottom portion 82 of transport mounting plate 74, preferably with screws or equivalent fastening means. The retractable pin support arm 98, with its integral sliding sleeve 106, is received within a generally rectangular channel 150 defined in the lateral portion 92 of the main support arm 90.

Figure 12:
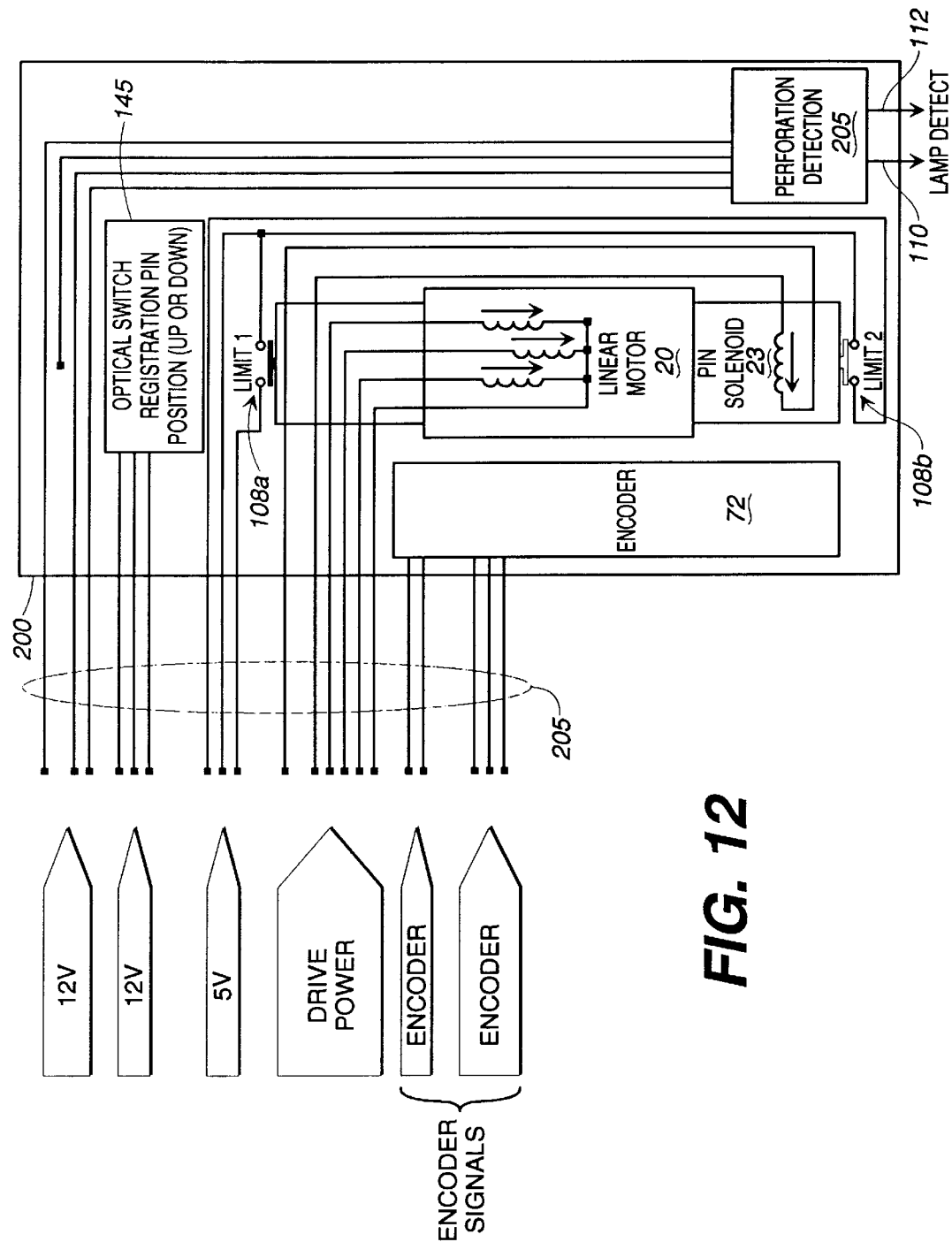
FIG. 12 is a schematic diagram of the circuit components employed in the preferred linear motor film gate.
Figure 13:
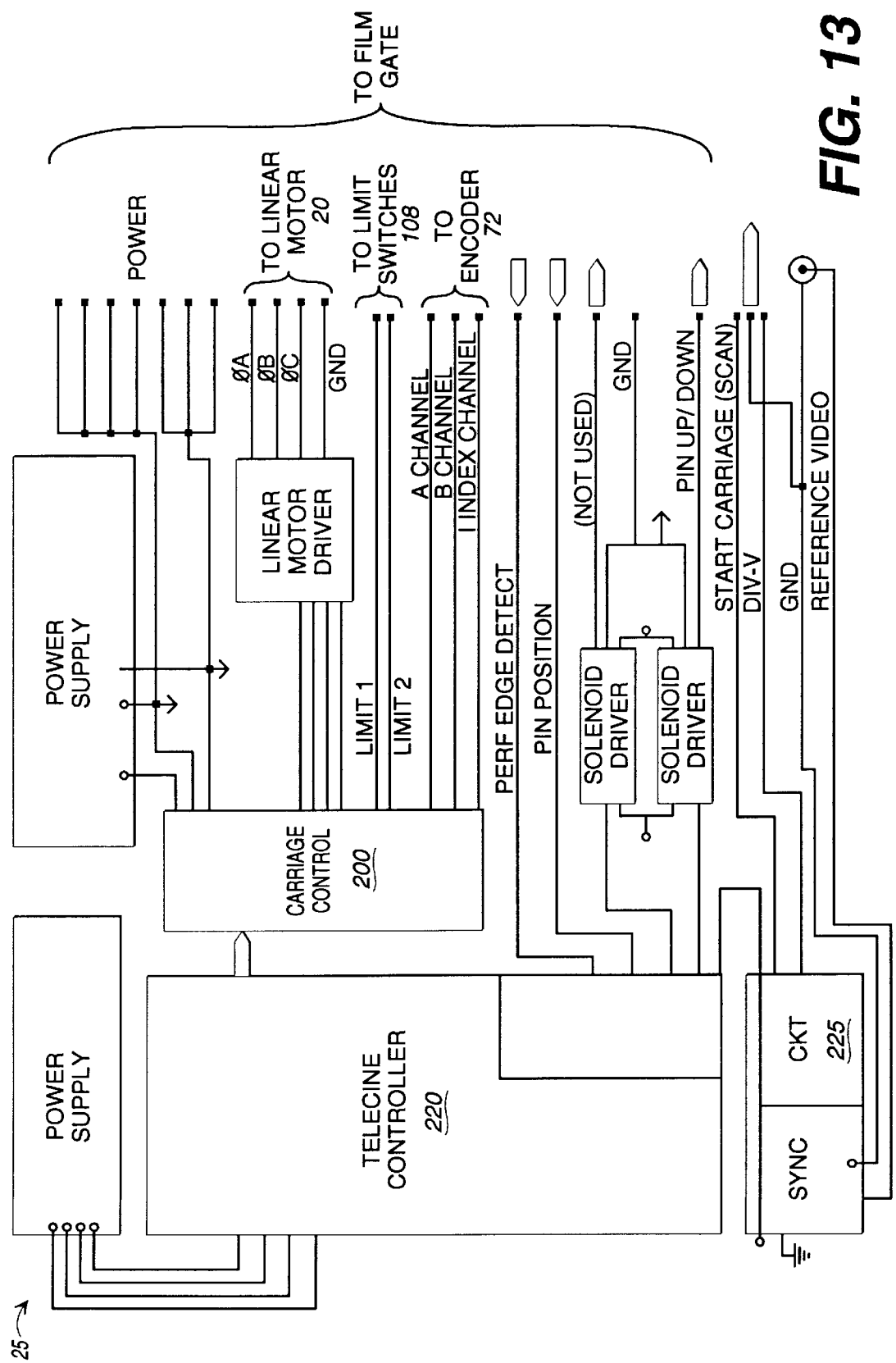
FIG. 13 is a schematic diagram showing the coupling of the control circuit of FIG. 12 to the telecine control circuit.

FIG. 12 illustrates the carriage control circuit 200 that is employed as a part of the control circuit 25 (FIG. 1; FIG. 13). The carriage control circuit 200 receives and conditions the sensor signals from the components of the preferred film gate 10 and provides them to the telecine control circuit 25, and receives control signals from the telecine control circuit.

The circuit elements of the carriage control circuit 200 include the linear motor 20, the linear optical position encoder 72, the solenoid 23, limit switches 108a, 108b that detect the extreme extents of movement of the linear motor, the registration pin position sensor 145, and a perforation detection circuit 205 comprising a light emitter (LAMP) that is coupled to the optical fiber 110 and a light detector (DETECT) that is coupled to the optical fiber 112. The circuit 200 is coupled to receive electrical power at appropriate voltage levels to drive the components and to provide sensor signals on lines 205.

FIG. 13 illustrates how the circuit components of the carriage control circuit 200 are coupled to the telecine and to the physical elements of the preferred linear motor film gate. A telecine controller 220 controls the operation of the telecine and controls the operation of the film gate 10. The telecine controller 220 is coupled to the carriage control circuit 200 and provides control signals and receives sensor signals. The telecine controller receives a signal designated PERF EDGE DETECT from the perforation detection circuit, which is employed to calculate when the pins are positioned for engagement with the film sprocket holes. A PIN POSITION signal from the registration pin position sensor 145 indicates when the registration pins are in the engaged or free position. A PIN UP/DOWN signal from a solenoid driver circuit commands the solenoid 23 raise or lower the registration pins.

The encoder 72 provides position signals A CHANNEL, B CHANNEL, and I INDEX CHANNEL, indicative of the absolute position of the linear motor and associated components. Limit switch signals LIMIT 1 and LIMIT 2 from the limit switches 108a, 108b indicate that the linear motor has reached the extent of its permissible movement (which is typically considered an error condition, likely indicative of a failure of the encoder 72).

A linear motor driver circuit provides appropriately phased drive signals φA, φB, φC, and GND to drive the linear motor 20.

Synchronization with the telecine is provided via the signal START CARRIAGE (SCAN) from a telecine sync circuit 225, which commands the carriage to scan a single film frame. The signal DIV_V (for NTSC) is a timing signal provided by the telecine at precise intervals of 83.3 milliseconds (ms) and is employed to indicate the start of a scan of a frame of film. For PAL equipment, the DIV_V signal will occur every 100 ms.

Figure 14:
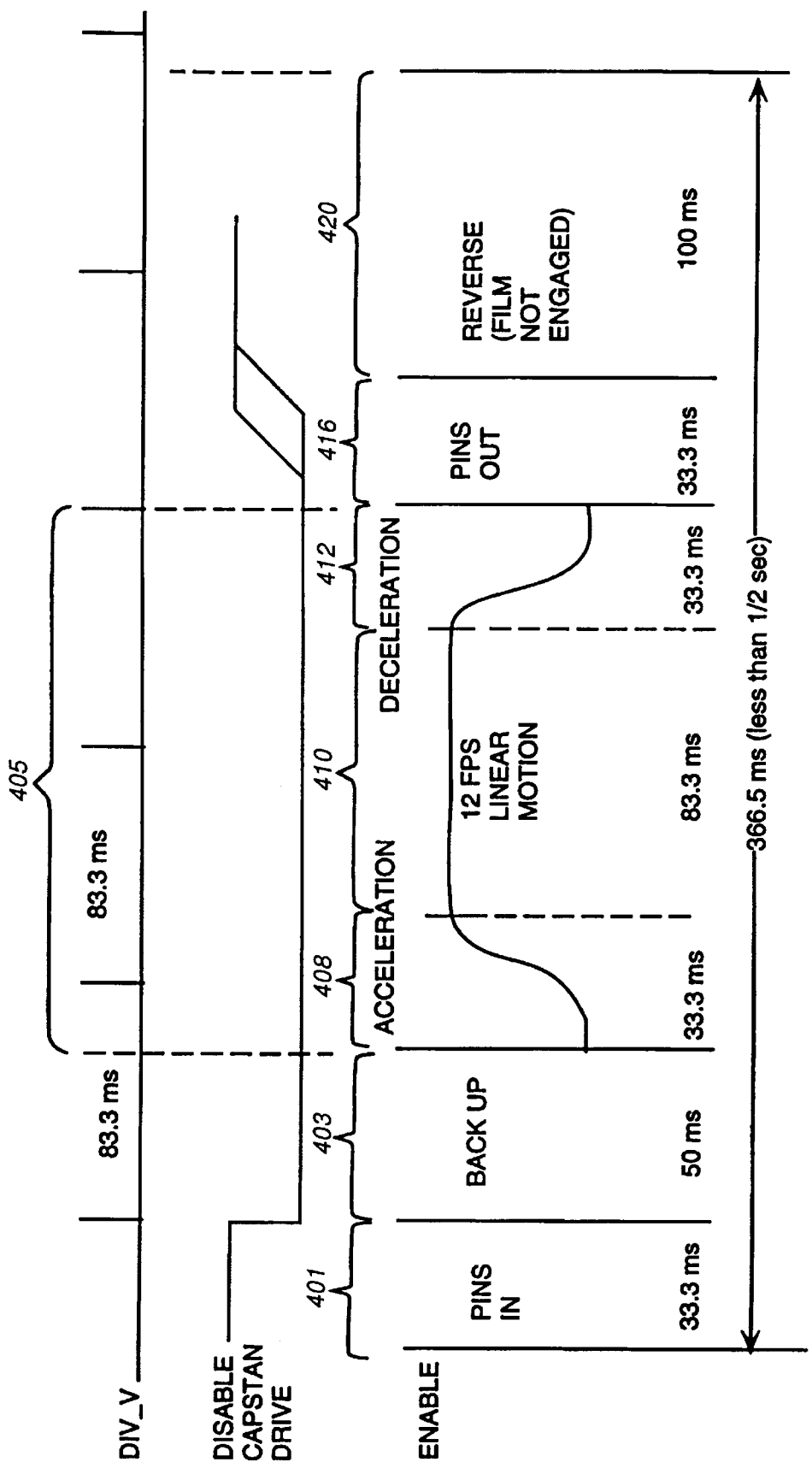
FIG. 14 is a timing diagram illustrating the preferred method of operation of the disclosed linear motor film gate.

FIG. 14 illustrates the presently preferred timing of the operation of the preferred film gate 10. The timing intervals and steps illustrated comprise a method of operation for the film gate.

The signal DIV_V is a synchronization timing signal provided by the telecine or by a house timing reference signal in a facility that employs the equipment. In the disclosed embodiment for NTSC, pulses are provided at a frequency of 12 Hz, which corresponds to a pulse interval of 83.3 ms (in PAL, the frequency is 10 Hz, to provide 100 ms intervals). The beginning of a scan cycle is indicated at the ENABLE, which corresponds to a command from the telecine to scan a frame of film. The ENABLE signal can occur asynchronously; the operations of scanning begin synchronized with the next occurring DIV_V pulse.

At the beginning of a scan cycle, the pin solenoid 23 is actuated, and a first "pins in" timing interval 401 of 33.3 ms is provided for engaging the registration pins into the perforations and mechanical settling. It is assumed here that the registration pins have been previously aligned into a proper position relative to the center of the perforations at the end of the preceding cycle, as described below.

During a second timing interval 403, the carriage 18 is backed up by actuating the linear motor 20 in the reverse direction a predetermined distance to "back up" the film. This is required to position the film so that during the next cycle, there is sufficient film leading that can provide the requisite acceleration of the film to get the film up to speed before passing the scanning aperture. In the disclosed system, there is approximately 4 millimeters of overshoot that results during the deceleration interval. Accordingly, the system backs the film up a total of 8 mm to recover the 4 mm of overshoot and provide 4 mm of film lead for acceleration for the next frame. In the disclosed embodiment, 50 ms is provided for the back up interval 403.

Note further that at the beginning of the back up interval 403 the capstan drive motor is "disabled". This is to ensure that the capstan motor does not resist the movement of the film. The capstan motor remains disabled until the pins are removed from the film perforations.

After the back up interval, the film is subjected to a travel interval 405, which includes an acceleration interval 408, a linear travel interval 410, and a deceleration interval 412. In the acceleration interval 408, preferably 33.3 ms, the film is accelerated to obtain a 12 frame per second linear speed. Once the film is up to speed, a linear travel or scanning interval 410 of 83.3 ms of precise linear motion (no acceleration or deceleration) at a speed of 12 frames per second (fps). The film frame being scanned is pulled in a tightly controlled linear fashion past the film aperture and scanned. After the entire frame has passed the aperture, the film is decelerated during a deceleration interval 412 of 33.3 ms. During the deceleration interval, the film comes to a complete stop.

After the film has come to rest, capstan motor servo is re-enabled and thus held in a "frozen" position to operate as a brake to hold the film still, and the registration pins are removed from the perforations. This takes place in a "pins out" or pin removal interval 416 of 33.3 ms.

Preferably, the capstan is electrically disabled but can be re-enabled for operation of the telecine in the normal mode. It will therefore be appreciated that the present invention allows operation in a capstan-driven scanning mode without having to rethread the film in a different manner for operation in a pin registered start/stop mode.

While the film is held immobile, after the pins are removed and clear of the film, a "reverse" or linear motor reversing interval 420 is provided. A period of 100 ms is preferably allowed for the linear motor to return from the position where it released the registration pins, back to an initial position, and mechanically settle. The optical sensor is employed during the reversal to detect that a perforation hole is indeed present above the pins (that is, two perforations away from the perforation detector), which indicates that the registration pins are aligned and in position under the perforations associated with the next film frame. The circuitry detects that the registration pins are in alignment with the perforations after the carriage stops. If not, an error condition is detected and the operator is notified.

Preferably, an entire cycle takes place in less than ½ second, i.e. 500 ms. As described, the process takes about 366 ms.

Figure 15:
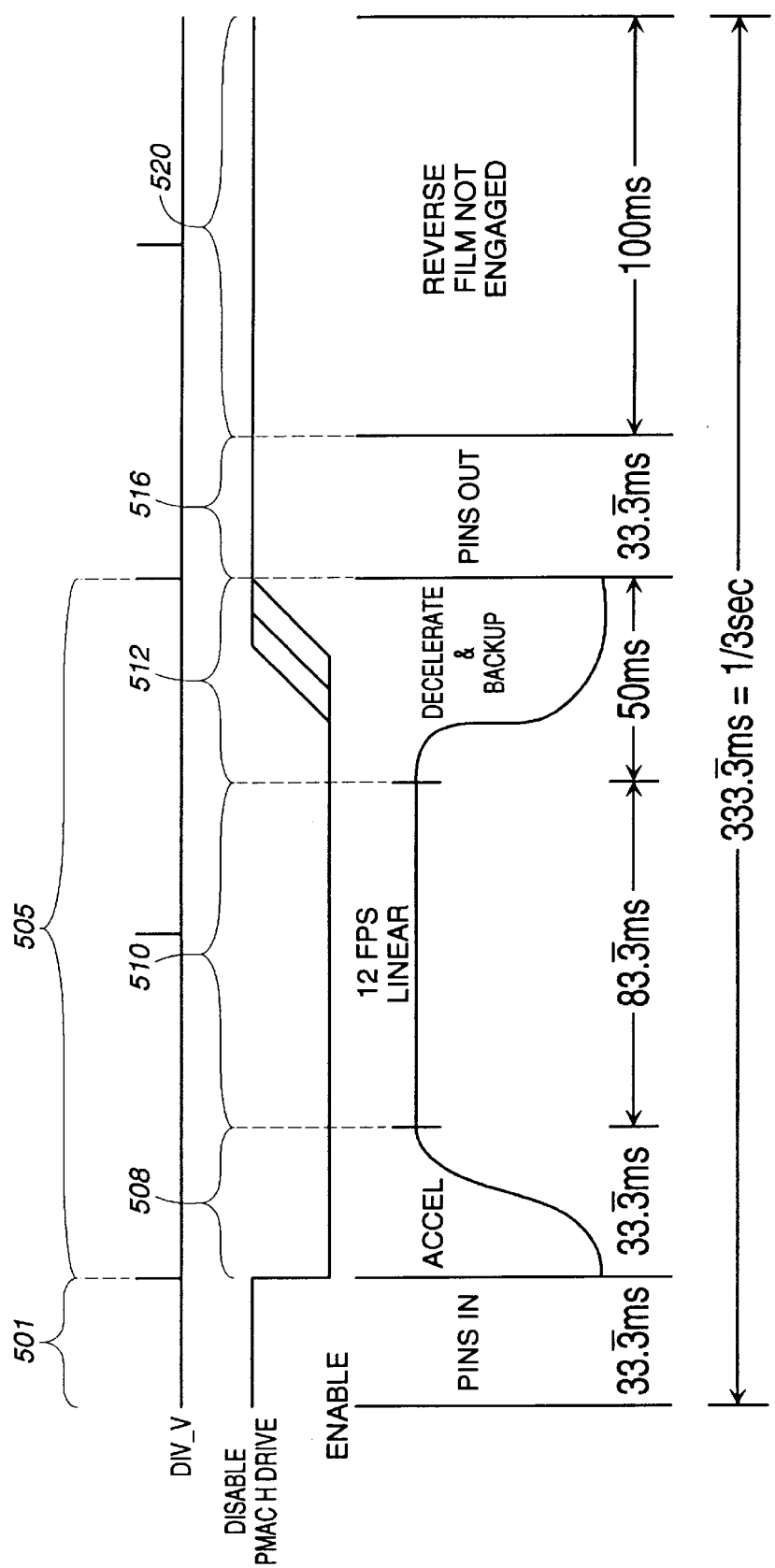
FIG. 15 is a timing diagram illustrating an alternative method of operation of the disclosed linear motor film gate.

FIG. 15 illustrates an alternative timing of the operation of the preferred film gate 10 wherein the backup of the film is carried out immediately after the linear portion of the film movement.

At the beginning of a scan cycle, a first "pins in" timing interval 501 of 33.3 milliseconds (ms) is provided for actuating the pin solenoid 23 to engage the registration pins into the perforations and mechanical settling. It is again assumed here that the registration pins have been previously aligned into a proper position at the end of the preceding cycle.

After the "pins in" interval, the film is subjected to a travel interval 505, which includes an acceleration interval 508, a linear travel interval 510, and a combined deceleration and back up interval 512. In the acceleration interval 508, preferably 33.3 ms, the film is accelerated to obtain a 12 frame per second linear speed. Once the film is up to speed, a linear travel or scanning interval 510 of 83.3 ms of precise linear motion (no acceleration or deceleration) at a speed of 12 fps. The film frame being scanned is pulled in a tightly controlled linear fashion past the film aperture and scanned. After the entire frame has passed the aperture, the film is decelerated to a stop, backed up 8 mm to compensate for overshoot and provide leading as described above, and mechanical settling during a deceleration and back up interval 512 of 50 ms. After this interval, the film comes to a complete stop.

After the film has come to rest after backing up a predetermined distance, capstan motor servo is held in a "frozen" position as a brake to hold the film still, and the registration pins are removed from the perforations. This takes place in a pin removal interval 516 of 33.3 ms.

While the film is held immobile, after the pins are removed, a "reverse" or linear motor reversing interval 520 is provided. A period of 100 ms is allowed for the linear motor to return from the position where it released the registration pins, back to an initial position. As before, the optical sensor is employed to detect when the registration pins are in position under the perforations associated with the next film frame. The circuitry detects that the registration pins are in alignment with the perforations after the carriage stops. If not, an error condition is detected and the operator is notified. Preferably, an entire cycle takes place in no more than about ⅓ second, i.e. 333.3 ms.

The preferred embodiments of the present invention have been disclosed by way of example and it will be understood that other modifications may occur to those skilled in the art without departing from the scope and the spirit of the appended claims.

What is claimed is:

1. A pin registered linear motion film gate for a motion picture telecine, comprising:
   a housing for supporting and transporting a film past a scanning means on the telecine, said housing including an aperture operative for receiving light from a light source that passes through the film and directing the light to the telecine scanning means;
   a selectably engageable pin assembly including at least one registration pin for engaging with at least one film sprocket perforation; and
   a linear motor for moving the pin assembly in a linear motion to transport a frame of the film past the aperture.

2. The pin registered linear motion film gate of claim 1, wherein said pin assembly comprises a pair of registration pins operative for simultaneous perpendicular engagement with a pair of oppositely disposed film sprocket perforations.

3. The pin registered linear motion film gate of claim 1, wherein said registration pin is shaped substantially in accordance with both the lateral and longitudinal dimensional specifications for the film sprocket perforations.

4. The pin registered linear motion film gate of claim 1, wherein said pin assembly comprises a linearly movable and retractable pin support arm mounted for perpendicular movement relative to said aperture plate and linear movement in the direction of film travel, said pin support arm carrying said registration pin;
   wherein said aperture plate includes a pin groove defined in the surface of said aperture plate; and
   further comprising means for moving said pin support arm and said registration pin to engage said registration pin into engagement with the film sprocket perforation and into said pin groove.

5. The pin registered linear motion film gate of claim 4, wherein said moving means comprises a linear actuator for actuating said pin assembly to engage the registration pin in a path perpendicular to the film plane.

6. The pin registered linear motion film gate of claim 1, wherein said housing includes an aperture plate, said aperture plate including said aperture, and a pair of elongate parallel film edge guides for confining the film as it travels past said aperture.

7. The pin registered linear motion film gate of claim 6, wherein said aperture plate film edge guides are affixed to said housing, wherein said aperture plate comprises a surface milled deeper than said edge guides, and further comprising a pair of elongate pin grooves milled into said aperture plate surface deeper than said aperture plate surface, said pin grooves for receiving said registration pins after engagement with said film sprocket perforations.

8. The pin registered linear motion film gate of claim 6, further comprising a pair of elongate skid rails for slidably supporting the film edges, said skid rails being elevated relative to the surface of said aperture plate to support the imaged portion of the film off of the surface.

9. The pin registered linear motion film gate of claim 1, wherein said pin assembly comprises:
   a transport plate affixed to said linear motor and operative for linear travel in the direction of film travel;
   a registration pin main support arm affixed to said transport plate and movable therewith;
   a retractable pin support arm for mounting said registration pin in operative juxtaposition with a film sprocket perforation;
   a linear actuator mounted to said housing;
   a guide rod affixed to said linear actuator extending in the direction of film travel; and
   a retractable sliding sleeve slidingly engaged with said guide rod and affixed to said retractable pin support arm, said sliding sleeve traveling along said guide rod and operative in response to actuation of said linear actuator for moving said pin support arm to engage said registration pin in a film sprocket perforation.

10. The pin registered linear motion film gate of claim 1, further comprising a perforation detector for detecting alignment of said registration pin with a film sprocket perforation.

11. The pin registered linear motion film gate of claim 1, further comprising film stabilizing means positioned proximate to the film gate for stabilizing the film as it is moved through the film gate.

12. The pin registered linear motion film gate of claim 11, wherein said film stabilizing means comprises an entry sprocket positioned adjacent to the film gate for guiding the film into the film gate, said entry sprocket including a ring of first sprocket teeth and a ring of second sprocket teeth, at least one of said rings of said sprocket teeth being sized and shaped substantially in accordance with both the lateral and longitudinal dimensional specifications for the film sprocket holes.

13. The pin registered linear motion film gate of claim 12, wherein the film passes over said aperture along a substantially horizontal planar pathway, said entry sprocket is mounted such that the film contacts with a circumferential portion of said entry sprocket and exits said entry sprocket and onto said planar pathway.

14. The pin registered linear motion film gate of claim 12, wherein said entry sprocket comprises a free rolling sprocket and wherein the dimensions of the teeth of said sprocket conform to ANSI standards for motion picture safety film, with Bell & Howell (B&H) perforations and Kodak rounded (KR) corners.

15. The pin registered linear motion film gate of claim 12, wherein the dimensions of the teeth of said sprocket is maintained within a tolerance of ±10 microns relative to predetermined standards for the film sprocket holes.

16. A pin registered linear motion film gate for a motion picture telecine, comprising:

a housing for supporting and transporting a film past a scanning means on the telecine, said housing including an aperture defined in an aperture plate, said aperture operative for receiving light from a light source that passes through the film and directing the light to the telecine scanning means;

a selectably engageable pin assembly including a linearly movable and retractable pin support arm mounted for perpendicular movement relative to said aperture plate and linear movement in the direction of film travel;

a pair of oppositely disposed registration pins mounted to said pin support arm for simultaneous perpendicular engagement with a pair of oppositely disposed film sprocket perforations, each of said registration pins shaped substantially in accordance with both the lateral and longitudinal dimensional specifications for the film sprocket perforations;

a linear actuator for actuating said pin assembly to move said retractable pin support arm toward the film to engage said registration pins in the film sprocket perforations in a path perpendicular to said aperture plate; and a linear motor for moving said pin assembly in a linear motion to transport a frame of the film past said aperture.

17. The pin registered linear motion film gate of claim 16, further comprising a pair of elongate parallel film edge guides for confining the film as it travels past said aperture.

18. The pin registered linear motion film gate of claim 17, wherein said aperture plate comprises a surface deeper than said edge guides and includes a pair of elongate pin grooves deeper than said aperture plate surface, said pin grooves for receiving said registration pins after engagement with the film sprocket perforations.

19. The pin registered linear motion film gate of claim 16, wherein said aperture plate comprises a pair of elongate skid rails for slidably supporting the film edges, said skid rails being elevated relative to the surface of said aperture plate to support the imaged portion of the film away from contact with the surface.

20. The pin registered linear motion film gate of claim 16, wherein said pin assembly comprises:

a transport plate affixed to said linear motor and operative for linear travel in the direction of film travel;

a registration pin main support arm affixed to said transport plate and movable therewith;

a guide rod affixed to said linear actuator extending in the direction of film travel; and a retractable sliding sleeve slidingly engaged with said guide rod and affixed to said retractable pin support arm, said sliding sleeve traveling along said guide rod and operative in response to actuation of said linear actuator for moving said pin support arm to engage said registration pins in the film sprocket perforations.

21. The pin registered linear motion film gate of claim 16, further comprising a perforation detector for detecting alignment of said registration pins with the film sprocket perforations.

22. The pin registered linear motion film gate of claim 16, further comprising film stabilizing means positioned proximate to the film gate for stabilizing the film as it is moved through the film gate.

23. The pin registered linear motion film gate of claim 22, wherein said film stabilizing means comprises an entry sprocket positioned adjacent to the film gate for guiding the film into the film gate, said entry sprocket including a ring of first sprocket teeth and a ring of second sprocket teeth, at least one of said rings of said sprocket teeth being sized and shaped substantially in accordance with both the lateral and longitudinal dimensional specifications for the film sprocket holes.

24. The pin registered linear motion film gate of claim 23, wherein the film passes over said aperture along a substantially horizontal planar pathway, said entry sprocket is mounted such that the film contacts with a circumferential portion of said entry sprocket and exits said entry sprocket and onto said planar pathway.

25. The pin registered linear motion film gate of claim 23, wherein said entry sprocket comprises a free rolling sprocket and wherein the dimensions of the teeth of said sprocket conform to ANSI standards for motion picture safety film, with Bell & Howell (B&H) perforations and Kodak rounded (KR) corners.

26. The pin registered linear motion film gate of claim 23, wherein the dimensions of the teeth of said sprocket is maintained within a tolerance of ±10 microns relative to predetermined standards for the film sprocket holes.

27. A method for scanning a frame of film in a telecine, comprising the steps of:

engaging at least one registration pin supported on a selectably engageable pin assembly in a film sprocket perforation of the film to be scanned, the registration pin shaped substantially in accordance with both the lateral and longitudinal dimensional specifications for the film sprocket perforation; and moving the pin assembly including the at least one registration pin as so engaged with the film in a linear motion along a linear path at a constant rate to move a frame of film past a scanning aperture, the scanning aperture operative for receiving light from a light source that passes through the film and directing the light to a telecine scanning means.

28. The method of claim 27, wherein the steps of the method are carried out with a film gate comprising an aperture plate including the scanning aperture, a linear motor that transports the pin assembly including the at least one registration pin along the linear path, and further comprising the step of engaging the pin assembly and the at least one registration pin with the film sprocket perforation along a path perpendicular to the plane of the film.

29. The method of claim 28, further comprising the step of stabilizing the film with a precision milled entry sprocket prior to introducing the film into the film gate.

30. The method of claim 29, wherein the step of stabilizing the film comprises engaging the film with an entry sprocket positioned adjacent to the film gate for guiding the film into the film gate, the entry sprocket including a ring of first sprocket teeth and a ring of second sprocket teeth, at least one of the rings of the sprocket teeth being sized and shaped substantially in accordance with both the lateral and longitudinal dimensional specifications for the film sprocket perforations.

31. The method of claim 30, wherein the film passes over the aperture along a substantially horizontal planar pathway, and wherein the entry sprocket is mounted such that the film contacts with a circumferential portion of the entry sprocket and exits the entry sprocket and onto the planar pathway.

32. The method of claim 30, wherein the entry sprocket comprises a free rolling sprocket and wherein the dimensions of the teeth of the sprocket conform to ANSI standards for motion picture safety film, with Bell & Howell (B&H) perforations and Kodak rounded (KR) corners.

33. The method of claim 30, wherein the dimensions of the teeth of the sprocket are maintained within a tolerance of ±10 microns relative to predetermined standards for the film sprocket perforations.

34. The method of claim 27, further comprising the step of engaging the film with a pair of oppositely disposed registration pins operative for simultaneous perpendicular engagement with a pair of oppositely disposed film sprocket perforations.

35. The method of claim 27, wherein the step of engaging at least one registration pin in a film sprocket perforation comprises:

detecting when the registration pin is aligned with the center of a film sprocket perforation with a perforation detector; and in response to a detection of pin alignment, moving the registration pin along a path perpendicular to the plane of the film and into engagement with the film sprocket perforation.

36. The method of claim 27, wherein the registration pin is affixed to a linearly movable and retractable pin support arm mounted for perpendicular movement relative to an aperture plate including the scanning aperture and linear movement in the direction of film travel, wherein the aperture plate includes a pin groove defined in the surface thereof; and further comprising the steps of:

moving the pin support arm and associated registration pin to engage the registration pin into engagement with the film sprocket perforation and into the pin groove, and moving the pin support arm and associated registration pin along the linear path with the registration pin engaged with the film sprocket perforation and extending into the pin groove.

37. The method of claim 27, wherein the scanning aperture is defined in an aperture plate, and further comprising the step of supporting the perforated edges of the film in an elevated position relative to the aperture plate to maintain the imaged portion of the film in a spaced apart relation to the aperture plate.

38. The method of claim 37, wherein the aperture plate includes the scanning aperture, and wherein the step of supporting the perforated edges of the film is carried out by a pair of elongate skid rails.

39. The method of claim 27, further comprising the steps of accelerating the film to the constant rate prior to the point at which the frame to be scanned first passes the scanning aperture, maintaining the film at the constant rate while the frame is scanned at the scanning aperture, and decelerating the film to a stop after the frame has passed the scanning aperture.

40. The method of claim 39, further comprising the step of backing up the film a predetermined distance relative to the scanning aperture to provide film leading for acceleration.

41. The method of claim 27, wherein the step of moving the registration pin along the linear path is carried out with a linear motor, and further comprising the steps of:

disengaging the registration pin from the film sprocket perforation after scanning the film frame;

reversing the linear motor after the registration pin is disengaged from the film sprocket perforation to return the registration pin to an initial position;

detecting when the registration pin is in alignment with a subsequent film sprocket perforation displaced a predetermined distance from an initial film sprocket perforation; and engaging the registration pin when the pin is in alignment with the subsequent film sprocket perforation.

42. The method of claim 41, wherein the telecine includes a motor driven capstan for moving the film in a continuous motion, and further comprising the steps of:

threading the film around the telecine capstan to firmly engage the film with the capstan;

disabling the capstan's motor drive when the pin is in engagement with the film sprocket perforation; and enabling the capstan's motor drive to hold the film stationary during the steps of disengaging the pin, reversing the linear motor, detecting pin alignment, and engaging the registration pin with a film sprocket perforation.

* * * * *